US012193017B2

(12) United States Patent
Khoshnevisan et al.

(10) Patent No.: US 12,193,017 B2
(45) Date of Patent: Jan. 7, 2025

(54) APERIODIC REPORTING OF CHANNEL STATE INFORMATION

(71) Applicant: QUALCOMM Incorporated, San Diego, CA (US)

(72) Inventors: Mostafa Khoshnevisan, San Diego, CA (US); Yitao Chen, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 17/538,960

(22) Filed: Nov. 30, 2021

(65) Prior Publication Data

US 2022/0210814 A1 Jun. 30, 2022

Related U.S. Application Data

(60) Provisional application No. 63/131,196, filed on Dec. 28, 2020.

(51) Int. Cl.
*H04W 72/23* (2023.01)
*H04B 7/06* (2006.01)
(Continued)

(52) U.S. Cl.
CPC .......... *H04W 72/23* (2023.01); *H04B 7/0626* (2013.01); *H04L 1/08* (2013.01); *H04L 5/0048* (2013.01); *H04L 5/0053* (2013.01)

(58) Field of Classification Search
CPC ..... H04W 72/23; H04W 24/10; H04W 72/20; H04B 7/0626; H04B 7/0408; H04L 1/08;
(Continued)

(56) References Cited

U.S. PATENT DOCUMENTS

2021/0051672 A1* 2/2021 Rastegardoost .... H04W 74/006
2021/0184819 A1* 6/2021 Takeda .................. H04W 24/10

FOREIGN PATENT DOCUMENTS

WO WO-2020044409 A1 3/2020

OTHER PUBLICATIONS

International Search Report and Written Opinion—PCT/US2021/061484—ISA/EPO—Mar. 16, 2022.

(Continued)

*Primary Examiner* — Kiet Tang

(74) *Attorney, Agent, or Firm* — Holland & Hart LLP

(57) ABSTRACT

Methods, systems, and devices for wireless communications are described. In some wireless communications systems, a user equipment (UE) may receive signaling scheduling a first set repetitions of a first uplink shared channel transmission associated with a first sounding reference signal (SRS) resource set and a second set of repetitions of a second uplink shared channel transmission associated with a second SRS resource set. The UE may receive a request to transmit one or more channel state information (CSI) reports and an indication that the CSI reports are to be multiplexed with one of the first set of repetitions or the second set of repetitions or with both of the first and second set of repetitions. The UE may then transmit the CSI reports in accordance with the indication by multiplexing the CSI reports with one or both of the first set of repetitions and the second set of repetitions.

30 Claims, 16 Drawing Sheets

(51) Int. Cl.
*H04L 1/08* (2006.01)
*H04L 5/00* (2006.01)

(58) Field of Classification Search
CPC ... H04L 5/0048; H04L 5/0053; H04L 1/0026; H04L 1/0027; H04L 1/1864; H04L 1/189; H04L 5/0055; H04L 5/0057; H04L 5/0094; H04L 5/0051
See application file for complete search history.

(56) References Cited

OTHER PUBLICATIONS

Vivo: "PUSCH Enhancements for URLLC", 3GPP Draft, 3GPP TSG RAN WG1 #101, R1-2003389, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020 May 16, 2020 (May 16, 2020), XP051885178, pp. 1-5, Retrieved from the Internet: URL: https://ftp.3gpp.org/tsg_ran/WG1_RL1/TSGR1_101-e/Docs/R1-2003389.zipR1-2003389.docx [retrieved on May 16, 2020] Section 2 . 2.

* cited by examiner

First SRS Resource Set

Second SRS Resource Set

APERIODIC REPORTING OF CHANNEL STATE INFORMATION

CROSS REFERENCE

The present Application for Patent claims the benefit of U.S. Provisional Patent Application No. 63/131,196 by KHOSHNEVISAN et al., entitled "APERIODIC REPORTING OF CHANNEL STATE INFORMATION," filed Dec. 28, 2020, assigned to the assignee hereof, and expressly incorporated by reference herein.

FIELD OF TECHNOLOGY

The following relates to wireless communications, including aperiodic reporting of channel state information (CSI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support communications using one or multiple antenna arrays at different devices. For instance, a network may communicate with a UE using one or more transmission/reception points (TRPs), where each TRP and the UE may have one or more antenna arrays to form directional beams. Efficient communications between UEs and one or multiple TRPs may help to enhance network throughput, latency, and reliability, and thus techniques to further improve efficient communications are desirable.

SUMMARY

The described techniques relate to improved methods, systems, devices, and apparatuses that support aperiodic reporting of channel state information (CSI). Various aspects provide techniques for communications between a user equipment (UE) and a base station in which the UE may transmit multiple repetitions of an uplink communication by different transmission beams to enhance the likelihood of successful receipt of the uplink communication. For example, the base station may transmit signaling scheduling repetitions of an uplink shared channel transmission (e.g., a physical uplink shared channel (PUSCH) transmission) including repetitions associated with two sounding reference signal (SRS) resource sets (e.g., two transmission beams). That is, the PUSCH transmission repetitions may include a first set of repetitions associated with a first SRS resource set and a second set of repetitions associated with a second SRS resource set. By transmitting PUSCH transmission repetitions by both the first SRS resource set and the second SRS resource set, a reliability of the PUSCH transmission may be higher when compared to PUSCH transmissions that utilize a single SRS resource set.

The base station may additionally request for the UE to transmit one or more CSI reports to the base station. For example, the base station may indicate for the UE to transmit one or more aperiodic CSI reports to the base station. Additionally or alternatively, the base station may indicate whether the UE is to multiplex the one or more CSI reports with one of the first set of PUSCH transmission repetitions or the second set of PUSCH transmission repetitions (e.g., each associated with different SRS resource sets) or whether the UE is to multiplex the one or more CSI reports with both of the first set of PUSCH transmission repetitions and the second set of PUSCH transmission repetitions. That is, in a first example the base station may indicate that the UE is to multiplex the one or more CSI reports with one of the sets of PUSCH transmission repetitions. Here, the UE may transmit the one or more CSI reports multiplexed with a PUSCH transmission repetition associated with a single SRS resource set. In a second example, the base station may indicate that the UE is to multiplex the one or more CSI reports with both sets of PUSCH repetitions. Here, the UE may transmit a first repetition of the one or more CSI reports multiplexed with a PUSCH transmission repetition associated with a first SRS resource set. Additionally or alternatively, the UE may transmit a second repetition of the one or more CSI reports multiplexed with a PUSCH transmission repetition associated with the second SRS resource set.

A method for wireless communication at a UE is described. The method may include receiving, from a base station, signaling that schedules a first set of repetitions of a first uplink shared channel transmission associated with a first SRS resource set and a second set of repetitions of a second uplink shared channel transmission associated with a second SRS resource set, receiving, from the base station, a request that the UE is to transmit one or more CSI reports, receiving, from the base station, an indication that the one or more CSI reports are to be multiplexed with one of the first set of repetitions or the second set of repetitions or with both of the first set of repetitions and the second set of repetitions, and transmitting the one or more CSI reports in accordance with the indication.

An apparatus for wireless communication at a UE is described. The apparatus may include a processor, memory in electronic communication with the processor, and instructions stored in the memory. The instructions may be executable by the processor to cause the apparatus to receive, from a base station, signaling that schedules a first set of repetitions of a first uplink shared channel transmission associated with a first SRS resource set and a second set of repetitions of a second uplink shared channel transmission associated with a second SRS resource set, receive, from the base station, a request that the UE is to transmit one or more CSI reports, receive, from the base station, an indication that the one or more CSI reports are to be multiplexed with one of the first set of repetitions or the second set of repetitions or with both of the first set of repetitions and the second set of repetitions, and transmit the one or more CSI reports in accordance with the indication.

Another apparatus for wireless communication at a UE is described. The apparatus may include means for receiving, from a base station, signaling that schedules a first set of repetitions of a first uplink shared channel transmission associated with a first SRS resource set and a second set of repetitions of a second uplink shared channel transmission associated with a second SRS resource set, means for receiving, from the base station, a request that the UE is to transmit one or more CSI reports, means for receiving, from the base station, an indication that the one or more CSI reports are to be multiplexed with one of the first set of repetitions or the second set of repetitions or with both of the first set of repetitions and the second set of repetitions, and means for transmitting the one or more CSI reports in accordance with the indication.

A non-transitory computer-readable medium storing code for wireless communication at a UE is described. The code may include instructions executable by a processor to receive, from a base station, signaling that schedules a first set of repetitions of a first uplink shared channel transmission associated with a first SRS resource set and a second set of repetitions of a second uplink shared channel transmission associated with a second SRS resource set, receive, from the base station, a request that the UE is to transmit one or more CSI reports, receive, from the base station, an indication that the one or more CSI reports are to be multiplexed with one of the first set of repetitions or the second set of repetitions or with both of the first set of repetitions and the second set of repetitions, and transmit the one or more CSI reports in accordance with the indication.

In some examples of the method, apparatuses, and non-transitory computer-readable medium described herein, multiplexing, based on receiving the indication that the one or more CSI reports may be multiplexed with both of the first set of repetitions and the second set of repetitions, a first of the one or more CSI reports with a first repetition of the first uplink shared channel transmission within the first set of repetitions, where the first repetition may be transmitted prior to remaining repetitions within the first set of repetitions and multiplexing a second of the one or more CSI reports with a second repetition of the second uplink shared channel transmission within the second set of repetitions, where the second repetition may be transmitted prior to remaining repetitions within the second set of repetitions.

Some examples of the method, apparatuses, and non-transitory computer-readable medium described herein may further include operations, features, means, or instructions for multiplexing the first of the one or more CSI reports with the first repetition includes multiplexing the first of the one or more CSI reports with a first actual repetition associated with the first repetition that may be transmitted prior to any other actual repetitions associated with the first repetition and multiplexing the second of the one or more CSI reports with the first repetition includes multiplexing the second of the one or more CSI reports with a second actual repetition associated with the second repetition that may be transmitted prior to any other actual repetitions associated with the second repetition.

In some examples of the method, apparatuses, and non-transitory computer-readable medium described herein, a first quantity of coded modulation symbols including the first of the one or more CSI reports equals a second quantity of coded modulation symbols including the second of the one or more CSI reports.

In some examples of the method, apparatuses, and non-transitory computer-readable medium described herein, a first payload size of first uplink control information included in the first repetition of the first uplink shared channel transmission equals a second payload size of second uplink control information included in the second repetition of the second uplink shared channel transmission and the first quantity of coded modulation symbols equals the second quantity of coded modulation symbols based on the first payload size being equal to the second payload size.

Some examples of the method, apparatuses, and non-transitory computer-readable medium described herein may further include operations, features, means, or instructions for determining the first quantity based on a payload size of uplink control information included in the first repetition of the first uplink shared channel transmission and selecting the second quantity based on determining the first quantity.

In some examples of the method, apparatuses, and non-transitory computer-readable medium described herein, multiplexing, based on receiving the indication that the one or more CSI reports may be multiplexed with one of the first set of repetitions or the second set of repetitions, the one or more CSI reports with a repetition from the first set of repetitions or the second set of repetitions that may be transmitted prior to remaining repetitions within the first set of repetitions and the second set of repetitions.

In some examples of the method, apparatuses, and non-transitory computer-readable medium described herein, transmitting the one or more CSI reports may include operations, features, means, or instructions for transmitting, based on receiving the indication that the one or more CSI reports may be multiplexed with both of the first set of repetitions and the second set of repetitions, a first repetition of the first uplink shared channel transmission including a first of the one or more CSI reports via a first transmission beam associated with the first SRS resource set and transmitting a second repetition of the second uplink shared channel transmission including a second of the one or more CSI reports via a second transmission beam associated with the second SRS resource set.

In some examples of the method, apparatuses, and non-transitory computer-readable medium described herein, receiving the indication may include operations, features, means, or instructions for receiving radio resource control (RRC) signaling indicating that the one or more CSI reports may be multiplexed with one of the first set of repetitions or the second set of repetitions or with both of the first set of repetitions and the second set of repetitions.

Some examples of the method, apparatuses, and non-transitory computer-readable medium described herein may further include operations, features, means, or instructions for receiving, from the base station, RRC signaling indicating a set of multiple CSI report groups which may be each associated with a trigger state, the CSI reports associated with a given trigger state may be multiplexed with one of the first set of repetitions or the second set of repetitions or with both of the first set of repetitions and the second set of repetitions based on the trigger state and receiving, from the base station, downlink control information (DCI) indicating one of the trigger states, where the DCI includes the request that the UE may be to transmit one or more CSI reports and the indication.

In some examples of the method, apparatuses, and non-transitory computer-readable medium described herein, receiving the indication may include operations, features, means, or instructions for receiving DCI indicating that the one or more CSI reports may be multiplexed with one of the first set of repetitions or the second set of repetitions or with both of the first set of repetitions and the second set of repetitions.

Some examples of the method, apparatuses, and non-transitory computer-readable medium described herein may further include operations, features, means, or instructions for determining that a quantity of repetitions in the first set of repetitions and the second set of repetitions may be two based on an absence of a transport block associate with the first uplink shared channel transmission and the second uplink shared channel transmission and receiving the indication that the one or more CSI reports may be multiplexed with both of the first set of repetitions and the second set of repetitions.

Some examples of the method, apparatuses, and non-transitory computer-readable medium described herein may further include operations, features, means, or instructions for receiving, from the base station, RRC signaling indicating a set of possible CSI report settings, where the request that the UE may be to transmit one or more CSI reports indicates one of the possible CSI report settings.

In some examples of the method, apparatuses, and non-transitory computer-readable medium described herein, receiving the signaling and receiving the request may include operations, features, means, or instructions for receiving DCI, where the DCI schedules the first set of repetitions and the second set of repetitions and requests that the UE may be to transmit one or more CSI reports.

In some examples of the method, apparatuses, and non-transitory computer-readable medium described herein, receiving the signaling that schedules the first set of repetitions and the second set of repetitions may include operations, features, means, or instructions for receiving DCI or RRC signaling indicating a quantity of repetitions in the first set of repetitions and the second set of repetitions.

A method for wireless communication at a base station is described. The method may include transmitting, to a UE, signaling that schedules a first set of repetitions of a first uplink shared channel transmission associated with a first SRS resource set and a second set of repetitions of a second uplink shared channel transmission associated with a second SRS resource set, transmitting, to the UE, a request that the UE is to transmit one or more CSI reports, transmitting, to the UE, an indication that the one or more CSI reports are to be multiplexed with one of the first set of repetitions or the second set of repetitions or with both of the first set of repetitions and the second set of repetitions, and receiving the one or more CSI reports in accordance with the indication.

An apparatus for wireless communication at a base station is described. The apparatus may include a processor, memory in electronic communication with the processor, and instructions stored in the memory. The instructions may be executable by the processor to cause the apparatus to transmit, to a UE, signaling that schedules a first set of repetitions of a first uplink shared channel transmission associated with a first SRS resource set and a second set of repetitions of a second uplink shared channel transmission associated with a second SRS resource set, transmit, to the UE, a request that the UE is to transmit one or more CSI reports, transmit, to the UE, an indication that the one or more CSI reports are to be multiplexed with one of the first set of repetitions or the second set of repetitions or with both of the first set of repetitions and the second set of repetitions, and receive the one or more CSI reports in accordance with the indication.

Another apparatus for wireless communication at a base station is described. The apparatus may include means for transmitting, to a UE, signaling that schedules a first set of repetitions of a first uplink shared channel transmission associated with a first SRS resource set and a second set of repetitions of a second uplink shared channel transmission associated with a second SRS resource set, means for transmitting, to the UE, a request that the UE is to transmit one or more CSI reports, means for transmitting, to the UE, an indication that the one or more CSI reports are to be multiplexed with one of the first set of repetitions or the second set of repetitions or with both of the first set of repetitions and the second set of repetitions, and means for receiving the one or more CSI reports in accordance with the indication.

A non-transitory computer-readable medium storing code for wireless communication at a base station is described. The code may include instructions executable by a processor to transmit, to a UE, signaling that schedules a first set of repetitions of a first uplink shared channel transmission associated with a first SRS resource set and a second set of repetitions of a second uplink shared channel transmission associated with a second SRS resource set, transmit, to the UE, a request that the UE is to transmit one or more CSI reports, transmit, to the UE, an indication that the one or more CSI reports are to be multiplexed with one of the first set of repetitions or the second set of repetitions or with both of the first set of repetitions and the second set of repetitions, and receive the one or more CSI reports in accordance with the indication.

Some examples of the method, apparatuses, and non-transitory computer-readable medium described herein may further include operations, features, means, or instructions for receiving, based on transmitting the indication that the one or more CSI reports may be multiplexed with both of the first set of repetitions and the second set of repetitions, a first of the one or more CSI reports with a first repetition of the first uplink shared channel transmission within the first set of repetitions, where the first repetition may be received prior to remaining repetitions within the first set of repetitions and receiving a second of the one or more CSI reports with a second repetition of the second uplink shared channel transmission within the second set of repetitions, where the second repetition may be received prior to remaining repetitions within the second set of repetitions.

Some examples of the method, apparatuses, and non-transitory computer-readable medium described herein may further include operations, features, means, or instructions for receiving the first of the one or more CSI reports with the first repetition includes receiving the first of the one or more CSI reports with a first actual repetition associated with the first repetition that may be received prior to any other actual repetitions associated with the first repetition and receiving the second of the one or more CSI reports with the first repetition includes receiving the second of the one or more CSI reports with a second actual repetition associated with the second repetition that may be received prior to any other actual repetitions associated with the second repetition.

In some examples of the method, apparatuses, and non-transitory computer-readable medium described herein, a first quantity of coded modulation symbols including the first of the one or more CSI reports equals a second quantity of coded modulation symbols including the second of the one or more CSI reports.

In some examples of the method, apparatuses, and non-transitory computer-readable medium described herein, a first payload size of first uplink control information included in the first repetition of the first uplink shared channel transmission equals a second payload size of second uplink control information included in the second repetition of the second uplink shared channel transmission and the first quantity of coded modulation symbols equals the second quantity of coded modulation symbols based on the first payload size being equal to the second payload size.

Some examples of the method, apparatuses, and non-transitory computer-readable medium described herein may further include operations, features, means, or instructions for receiving, based on transmitting the indication that the one or more CSI reports may be multiplexed with one of the first set of repetitions or the second set of repetitions, the one or more CSI reports with a repetition from the first set of repetitions or the second set of repetitions that may be received prior to remaining repetitions within the first set of repetitions and the second set of repetitions.

In some examples of the method, apparatuses, and non-transitory computer-readable medium described herein, receiving the one or more CSI reports may include operations, features, means, or instructions for receiving, based on transmitting the indication that the one or more CSI reports may be multiplexed with both of the first set of repetitions and the second set of repetitions, a first repetition of the first uplink shared channel transmission including a first of the one or more CSI reports via a first transmission beam associated with the first SRS resource set and receiving a second repetition of the second uplink shared channel transmission including a second of the one or more CSI reports via a second transmission beam associated with the second SRS resource set.

In some examples of the method, apparatuses, and non-transitory computer-readable medium described herein, transmitting the indication may include operations, features, means, or instructions for transmitting RRC signaling indicating that the one or more CSI reports may be multiplexed with one of the first set of repetitions or the second set of repetitions or with both of the first set of repetitions and the second set of repetitions.

Some examples of the method, apparatuses, and non-transitory computer-readable medium described herein may further include operations, features, means, or instructions for transmitting, to the UE, RRC signaling indicating a set of multiple CSI report groups which may be each associated with a trigger state, the CSI reports associated with a given trigger state may be multiplexed, by the UE, with one of the first set of repetitions or the second set of repetitions or with both of the first set of repetitions and the second set of repetitions based on the trigger state and transmitting, to the UE, DCI indicating one of the trigger states, where the DCI includes the request that the UE may be to transmit one or more CSI reports and the indication.

In some examples of the method, apparatuses, and non-transitory computer-readable medium described herein, transmitting the indication may include operations, features, means, or instructions for transmitting DCI indicating that the one or more CSI reports may be multiplexed with one of the first set of repetitions or the second set of repetitions or with both of the first set of repetitions and the second set of repetitions.

In some examples of the method, apparatuses, and non-transitory computer-readable medium described herein, a quantity of repetitions in the first set of repetitions and the second set of repetitions may be two based on an absence of a transport block associate with the first uplink shared channel transmission and the second uplink shared channel transmission and transmitting the indication that the one or more CSI reports may be multiplexed with both of the first set of repetitions and the second set of repetitions.

Some examples of the method, apparatuses, and non-transitory computer-readable medium described herein may further include operations, features, means, or instructions for transmitting, to the UE, RRC signaling indicating a set of possible CSI report settings, where the request that the UE may be to transmit one or more CSI reports indicates one of the possible CSI report settings.

In some examples of the method, apparatuses, and non-transitory computer-readable medium described herein, transmitting the signaling and transmitting the request may include operations, features, means, or instructions for transmitting DCI, where the DCI schedules the first set of repetitions and the second set of repetitions and requests that the UE may be to transmit one or more CSI reports.

In some examples of the method, apparatuses, and non-transitory computer-readable medium described herein, transmitting the signaling may include operations, features, means, or instructions for transmitting DCI or RRC signaling indicating a quantity of repetitions in the first set of repetitions and the second set of repetitions.

DETAILED DESCRIPTION

Figure 1:
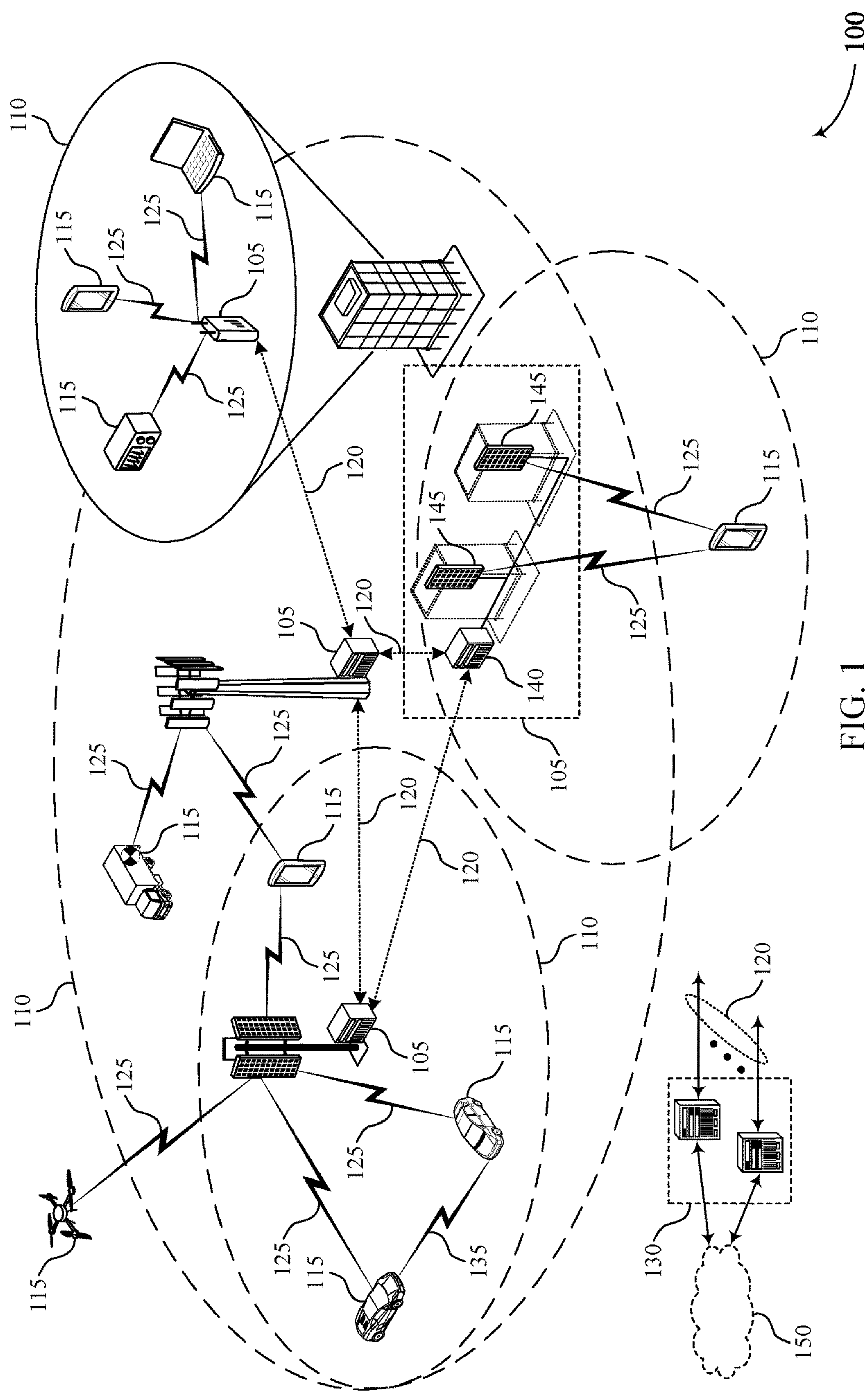
FIG. 1 illustrates an example of a wireless communications system that supports aperiodic reporting of channel state information (CSI) in accordance with aspects of the present disclosure.

In some wireless communications systems, a user equipment (UE) may communicate with a base station using multiple repetitions of an uplink communication by different transmission beams to enhance the likelihood of successful receipt of the uplink communication. In some cases, the UE may transmit uplink communications based on parameters (e.g., a number of antenna ports, a spatial domain filter or beam, a rank or number of layers, or any combinations thereof) that are determined from a sounding reference signal (SRS) resource set (e.g., associated with a transmission beam of the UE). For example, the base station may transmit signaling scheduling repetitions of an uplink shared channel transmission (e.g., a physical uplink shared channel (PUSCH) transmission) including repetitions associated with two SRS resource sets (e.g., two transmission beams). That is, the PUSCH transmission repetitions may include a first set of repetitions associated with a first SRS resource set and a second set of repetitions associated with a second SRS resource set. By transmitting PUSCH transmission repetitions by both the first SRS resource set and the second SRS resource set, a reliability of the PUSCH transmission may be higher when compared to PUSCH transmissions that utilize a single SRS resource set.

The base station may additionally request for the UE to transmit one or more CSI reports to the base station. For example, the base station may indicate for the UE to transmit one or more aperiodic CSI reports to the base station. Additionally or alternatively, the base station may indicate whether the UE is to multiplex the one or more CSI reports with one of the first set of PUSCH transmission repetitions or the second set of PUSCH transmission repetitions (e.g., each associated with different SRS resource sets) or whether the UE is to multiplex the one or more CSI reports with both of the first set of PUSCH transmission repetitions and the second set of PUSCH transmission repetitions. That is, in a first example the base station may indicate that the UE is to multiplex the one or more CSI reports with one of the sets of PUSCH transmission repetitions. Here, the UE may transmit the one or more CSI reports multiplexed with a PUSCH transmission repetition associated with a single SRS resource set. In a second example, the base station may indicate that the UE is to multiplex the one or more CSI reports with both sets of PUSCH repetitions. Here, the UE may transmit a first repetition of the one or more CSI reports multiplexed with a PUSCH transmission repetition associated with a first SRS resource set. Additionally or alternatively, the UE may transmit a second repetition of the one or more CSI reports multiplexed with a PUSCH transmission repetition associated with the second SRS resource set.

Aspects of the disclosure are initially described in the context of wireless communications systems. Aspects of the disclosure are then described in the context of PUSCH transmission configurations and a process flow. Aspects of the disclosure are further illustrated by and described with reference to apparatus diagrams, system diagrams, and flowcharts that relate to aperiodic reporting of CSI.

FIG. 1 illustrates an example of a wireless communications system 100 that supports aperiodic reporting of CSI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems 100, a UE 115 may communicate with a base station 105 using multiple repetitions of an uplink communication by different transmission beams to enhance the likelihood of successful receipt of the uplink communication. In some cases, the UE 115 may transmit uplink communications based on parameters (e.g., a number of antenna ports, a spatial domain filter or beam, a rank or number of layers, or any combinations thereof) that are determined from an SRS resource set (e.g., associated with a transmission beam of the UE 115). For example, the base station 105 may transmit signaling scheduling repetitions of an uplink shared channel transmission (e.g., a PUSCH transmission) including repetitions associated with two SRS resource sets (e.g., two transmission beams). That is, the PUSCH transmission repetitions may include a first set of repetitions associated with a first SRS resource set and a second set of repetitions associated with a second SRS resource set. By transmitting PUSCH transmission repetitions by both the first SRS resource set and the second SRS resource set, a reliability of the PUSCH transmission may be higher when compared to PUSCH transmissions that utilize a single SRS resource set.

The base station 105 may additionally transmit a request for the UE 115 to transmit one or more CSI reports to the base station 105. For example, the base station 105 may indicate for the UE 115 to transmit one or more aperiodic CSI reports to the base station 105. Additionally or alternatively, the base station 105 may indicate whether the UE 115 is to multiplex the one or more CSI reports with one of the first set of PUSCH transmission repetitions or the second set of PUSCH transmission repetitions (e.g., each associated with different SRS resource sets) or whether the UE 115 is to multiplex the one or more CSI reports with both of the first set of PUSCH transmission repetitions and the second set of PUSCH transmission repetitions. That is, in a first example the base station 105 may indicate that the UE 115 is to multiplex the one or more CSI reports with one of the sets of PUSCH transmission repetitions. Here, the UE 115 may transmit the one or more CSI reports multiplexed with a PUSCH transmission repetition associated with a single SRS resource set. In a second example, the base station 105 may indicate that the UE 115 is to multiplex the one or more CSI reports with both sets of PUSCH repetitions. Here, the UE 115 may transmit a first repetition of the one or more CSI reports multiplexed with a PUSCH transmission repetition associated with a first SRS resource set. Additionally or alternatively, the UE 115 may transmit a second repetition of the one or more CSI reports multiplexed with a PUSCH transmission repetition associated with the second SRS resource set.

Figure 2:
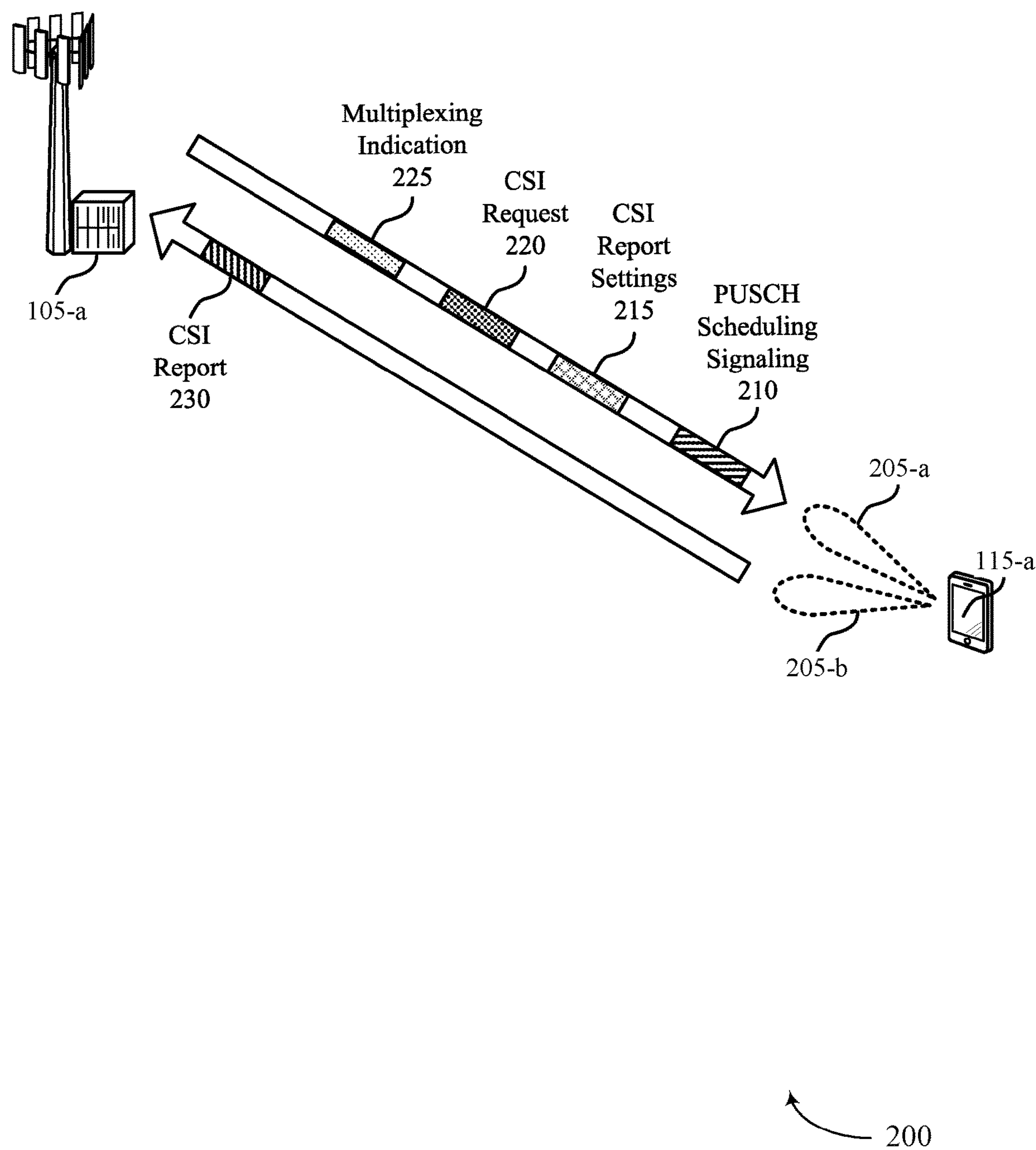
FIG. 2 illustrates an example of a wireless communications system that supports aperiodic reporting of CSI in accordance with aspects of the present disclosure.

FIG. 2 illustrates an example of a wireless communications system 200 that supports aperiodic reporting of CSI in accordance with aspects of the present disclosure. In some examples, the wireless communications system 200 may implement aspects of wireless communications system 100. For example, the wireless communications system 200 includes base station 105-*a* and UE 115-*a*, which may be examples of the respective devices as described with reference to FIG. 1. It is to be understood that references to specific wireless devices (e.g., UEs 115, TRPs, base stations 105) in the below figures are provided for illustrative purposes, and different wireless devices not specifically referred to herein may be used interchangeably with those described herein. Likewise, the described operations performed by UE 115-*a* may, in some cases, be performed by base station 105-*a* (or a TRP associated with the base station 105-*a*), and vice versa.

In some cases, the communications illustrated in wireless communications system 200 may be an example of the UE 115-*a* performing aperiodic reporting of CSI in response to a CSI request 220 from the base station 105-*a*. Prior to transmitting the CSI request 220, the base station 105-*a* may transmit PUSCH scheduling signaling 210 to the UE 115-*a*. In some instances, the PUSCH scheduling signaling 210 may schedule one or more repetitions of an uplink shared channel transmission (e.g., a PUSCH transmission). For example, the PUSCH scheduling signaling 210 may be radio resource control (RRC) signaling and may semi-statically configure a quantity of repetitions for the PUSCH transmission (e.g., via a pusch-AggregationFactor value). In another example, the PUSCH scheduling signaling 210 may be RRC signaling and may indicate different possible quantities of repetitions for the PUSCH transmissions (e.g., within a time domain resource allocation (TDRA) table). Here, the PUSCH scheduling signaling 210 may additionally include downlink control information (DCI) or a media access control-control element (MAC-CE) indicating which of the possible quantities of repetitions for the PUSCH transmissions the UE 115-*a* is to use (e.g., via a numberofrepetitions variable).

The PUSCH scheduling signaling 210 may additionally configure a type of PUSCH repetition for PUSCH transmissions. For example, the base station 105-*a* may indicate (e.g., via the PUSCH scheduling signaling 210) a type of PUSCH repetition where each repetition of PUSCH transmission is transmitted via a same set of slots within a symbol. For example, the base station 105-*a* may indicated for the UE 115-*a* to transmit each repetition of a PUSCH transmission via the fourth through the tenth slots within a quantity of symbols (e.g., that is the same as the quantity of PUSCH repetitions). In another example, the base station 105-*a* may indicate a type of PUSCH repetition where each PUSCH repetition is consecutive. For example, each PUSCH repetition may be transmitted by a consecutive set of symbols that cross a slot boundary. In this type of PUSCH repetition, the base station 105-*a* may indicate a quantity of nominal PUSCH repetition transmissions that may be different from a quantity of actual PUSCH repetitions transmissions. In one case, a nominal PUSCH repetition transmission may include symbols that cross a slot boundary. Here, the UE 115-*a* may transmit two actual PUSCH repetitions (e.g., each associated with the symbols associated with a single slot) corresponding to the single nominal PUSCH repetition. In another case, the UE 115-*a* may determine that one or more of the symbols associated with a nominal PUSCH repetition may be invalid (e.g., due to semi-static downlink symbols, based on an indication of the symbol being invalid, due to synchronization signal block (SSB) symbols, for symbols associated with a control resource set (CORESET) 0 for Type0-physical downlink control channel (PDCCH)). Here, the actual PUSCH repetition may include less symbols than the nominal PUSCH repetition.

The PUSCH scheduling signaling 210 may additionally indicate that the PUSCH repetitions may correspond to two SRS resource sets. For example, the PUSCH scheduling signaling 210 may include DCI indicating the two SRS resource sets. In some cases, the two SRS resource sets may each be associated with different transmission beams 205 of the UE 115-*a*. For example, the transmission beam 205-*a* may be associated with a first SRS resource set and the transmission beam 205-*b* may be associated with a second SRS resource set. Additionally or alternatively, each SRS resource set may be associated with unique transmission power control parameters. When the PUSCH scheduling signaling 210 indicates that the PUSCH repetitions correspond to two SRS resource sets, the PUSCH scheduling signaling 210 may configure a first set of repetitions of the PUSCH transmission associated with the first SRS resource set and a second set of repetitions of the PUSCH transmission associated with the second SRS resource set.

In some instances, the base station 105-*a* may transmit the PUSCH scheduling signaling 210 indicating that the PUSCH correspond to two SRS resource sets in instances that the base station 105-*a* is associated with multiple TRPs, panels, antennas, or a combination thereof. Here, transmitting the PUSCH repetitions using multiple SRS resource sets may increase a reliability of the PUSCH transmission when compared to transmitting the PUSCH repetitions using a single SRS resource set. That is, if a transmission of a first PUSCH repetition by the transmission beam 205-*a* is blocked (e.g., the base station 105-*a* does not receive the transmission from the transmission beam 205-*a*), the base station 105-*a* may successfully receive a second PUSCH repetition transmitted by the transmission beam 205-*b*.

The base station 105-*a* may transmit CSI report settings 215. For example, the base station 105-*a* may transmit an indication of the CSI report settings 215 by RRC signaling (e.g., using an AperiodicTriggerStateList parameter). The RRC signaling may configure a number of trigger states (e.g., up to 128) each associated with one or more (e.g., up to 16) CSI report settings (e.g., CSI report groups). For example, each trigger state may indicate a quantity of CSI reports associated with the trigger state.

The base station 105-*a* may transmit the CSI request 220. In some cases, the CSI request 220 may request that the UE 115-*a* is to transmit one or more CSI reports 230 to the base station 105-*a*. The CSI request 220 may indicate one of the trigger states activated through MAC-CE. For example, the CSI request 220 may be a field in uplink DCI indicating one of the trigger states. Here, a size of a field within the uplink DCI including the CSI request 220 may enable the base station 105-*a* to indicate any of the configured trigger states. For example, if the base station 105-*a* configured 63 trigger states, the field for the CSI request 220 may include six bits. Here, the CSI request 220 may not request a CSI report in a case when each bit of the CSI request 220 is '0'.

The base station 105-*a* may additionally transmit a multiplexing indication 225 to the UE 115-*a*. The multiplexing indication 225 may indicate whether the UE 115-*a* is to multiplex the one or more requested CSI reports 230 with one of the first set of repetitions or the second set of repetitions or with both the first set of repetitions and the second set of repetitions. In one example, the base station 105-*a* may transmit the multiplexing indication 225 via RRC signaling. Here, the multiplexing indication 225 may be semi-statically configured in bandwidth part or serving cell RRC configuration. In another example, the multiplexing indication 225 may be based on the trigger state indicated by the CSI request 220. For example, the base station 105-*a* may transmit DCI indicating one of the trigger states, and each trigger state may be associated with a multiplexing indication 225 configured by RRC signaling. In another example, the base station 105-*a* may transmit the multiplexing indication 225 via DCI. That is, the DCI may include a field (e.g., a 1-bit field) that indicates whether the UE 115-*a* is to multiplex the one or more requested CSI reports 230 with one of the first set of repetitions or the second set of repetitions or with both the first set of repetitions and the second set of repetitions.

In a first example, the multiplexing indication 225 may indicate that the UE 115-*a* is to multiplex the one or more CSI reports 230 with one of the sets of repetitions of the PUSCH transmission. That is, the base station 105-*a* may have configured to the UE 115-*a* to transmit a first set of repetitions of a PUSCH transmission using a first SRS resource set and a second set of repetitions of the PUSCH transmission using a second SRS resource set. Additionally or alternatively, the multiplexing indication 225 may indicate that the UE 115-*a* is to transmit the one or more CSI reports 230 via one of the sets of PUSCH transmissions (e.g., using either the first SRS resource set or the second SRS resource set). Here, the UE 115-*a* may multiplex the CSI report 230 on a PUSCH transmission associated with one of the SRS resource sets and transmit the CSI report (that is multiplexed with the PUSCH transmission) using either the transmission beam 205-*a* or the transmission beam 205-*b*.

In a second example, the multiplexing indication 225 may indicate that the UE 115-*a* is to multiplex the one or more CSI reports 230 with both of the sets of repetitions of the PUSCH transmission. Here, the UE 115-*a* may multiplex a first repetition of the one or more CSI reports 230 with a PUSCH repetition from the first set of repetitions (e.g., associated with the first SRS resource set) and a second repetition of the one or more CSI reports 230 with a PUSCH repetition from the second set of repetitions (e.g., associated with the second SRS resource set). The UE 115-*a* may then transmit the first repetition of the one or more CSI reports 230 (e.g., that is multiplexed with a PUSCH repetition from the first set of repetitions) using the transmission beam 205-*a* and transmit the second repetition of the one or more CSI reports 230 (e.g., that is multiplexed with a PUSCH repetition from the second set of repetitions) using the transmission beam 205-*b*.

In one case, the multiplexing indication 225 may indicate that the UE 115-*a* is to multiplex the one or more CSI reports 230 with both of the sets of repetitions of the PUSCH transmission. Additionally or alternatively, the PUSCH may not have a transport block and may be scheduled by a CSI request field on a DCI (e.g., when an UL-SCH parameter of the DCI is set to '0'). Here, the UE 115-*a* may assume that a quantity of repetitions of the PUSCH is two (e.g., even if the PUSCH scheduling signaling 210 indicates a different quantity of repetitions). Additionally or alternatively, the UE 115-*a* may transmit the CSI report 230 on both of the two PUSCH repetitions by multiplexing the CSI report 230 with both of the two PUSCH repetitions. In some cases, the UE 115-*a* may additionally assume that the actual transmissions of the two PUSCH repetitions and the nominal transmissions of the two PUSCH transmissions are the same (e.g., no segmentation).

To multiplex the one or more CSI reports 230 with two PUSCH repetitions, the UE may encode and rate match uplink control information (UCI) (e.g., the CSI reports 230) based on a parameter (e.g., a Betaoffset parameter) that is indicated by the base station 105-*a* via DCI or semi-statically configured (e.g., by RRC signaling). In some cases, the size of each repetition of the one or more CSI reports 230 may be the same for the first and second PUSCH repetitions. However, the two PUSCH repetitions may include different quantities of other UCIs. In some cases, this may impact the size of each of the one or more CSI reports 230.

In the example of wireless communications system 200, the UE 115-*a* may ensure that the number of coded modulation symbols (e.g., the number of resource elements) for each repetition of the one or more CSI reports 230 is the same for each PUSCH repetition. In one case, the size of other UCI payloads within each PUSCH repetition may be the same, thus ensuring that a size of the CSI reports 230 is the same between PUSCH repetitions. Here, the UE 115-*a* may additionally assume that a duration of both PUSCH repetitions are the same (e.g., the actual duration of each PUSCH repetition is the same). In a case that the size of the CSI reports 230 is the same and that the duration of both PUSCH repetitions are the same, the UE 115-*a* may determine the coded modulation symbols per layer (e.g., a quantity of resource elements) associated with the CSI report 230 for one of the PUSCH repetitions and may use that same quantity of resource elements for the CSI report 230 multiplexed with the other PUSCH repetition. In some instances, the UE 115-*a* may use the quantity of resource elements associated with the CSI report 230 based on the CSI report 230 that is transmitted earlier, later, the quantity of resource elements associated with the CSI report 230 (e.g., the CSI report that has a larger quantity of resource elements, the CSI report 230 that has a smaller quantity of resource elements), a duration of the CSI report 230 (e.g., the CSI report 230 that has a longer duration, the CSI report 230 that has a shorter duration), or based on the SRS resource set (or corresponding transmission beam 205) associated with the CSI report 230. In an example where the size of the CSI reports 230 is not the same, the duration of both PUSCH repetitions are not the same, or both, the UE 115-*a* may determine that the PUSCH repetitions carrying the CSI reports 230 may not carry any other UCI payloads to ensure that the size of the CSI reports 230 is the same between PUSCH repetitions.

Figure 3A:
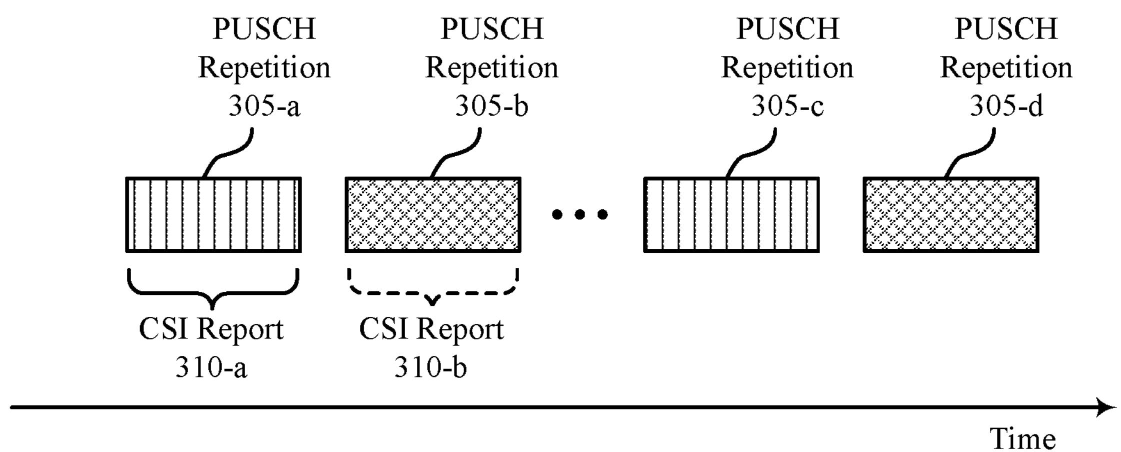
FIGS. 3A and 3B illustrate example PUSCH transmission configurations that support aperiodic reporting of CSI in accordance with aspects of the present disclosure.
Figure 3B:
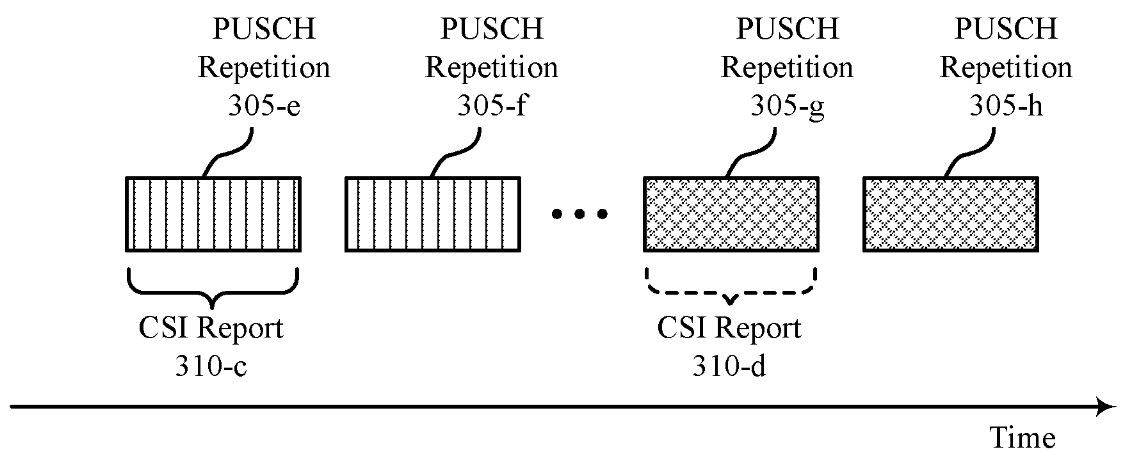

FIGS. 3A and 3B illustrate examples of PUSCH transmission configurations 300 that support aperiodic reporting of CSI in accordance with aspects of the present disclosure. For example, PUSCH transmission configurations 300 may illustrate example PUSCH transmission configurations including PUSCH repetitions 305 transmitted by different SRS resource sets and including one or more CSI reports 310. In some examples, the PUSCH transmission configurations 300 may implement aspects of wireless communications as described with reference to FIGS. 1 and 2. For example, for both PUSCH transmission configurations 300, a base station may configure (e.g., by RRC signaling, by DCI) two sets of PUSCH repetitions 305 each associated with different SRS resource sets as described with reference to FIGS. 1 and 2.

In the example of the PUSCH transmission configuration 300-*a*, the base station may configure the UE to switch between transmitting PUSCH repetitions 305 associated with the first SRS resource set and transmitting PUSCH repetitions 305 associated with the second SRS resource set. In the example of the PUSCH transmission configuration 300-*b*, the base station may configure the UE to transmit each PUSCH repetition 305 associated with the first SRS resource set prior to transmitting the PUSCH repetitions 305 associated with the second SRS resource set.

For either configuration 300, the base station may additionally indicate whether the UE is to multiplex the one or more CSI reports 310 with one of the PUSCH repetitions 305 associated with either the first SRS resource set or the second SRS resource set or with one of the PUSCH repetitions 305 associated with both the first SRS resource set and the second SRS resource set. In a first example of the PUSCH transmission configurations 300, the base station may indicate, to a UE transmitting the PUSCH repetitions 305, that the one or more CSI reports 310 are to be multiplexed with one of the PUSCH repetitions 305 associated with the first SRS resource set. Here, the UE may multiplex the one or more CSI reports 310 with an earliest PUSCH repetition 305 within the SRS resource set. In some cases, the first or earliest actual PUSCH repetition 305 may be different from the first or earliest nominal PUSCH repetition 305. Here, the UE may still multiplex the CSI report 310 with the first or earliest PUSCH repetition 305. For example, the UE may assume that the first PUSCH repetition 305 associated with each SRS resource set has a duration greater than one symbol. In the case of PUSCH transmission configuration 300-*a*, the UE may multiplex the one or more CSI reports 310-*a* with the PUSCH repetition 305-*a*, which may the first (e.g., the earliest) PUSCH repetition 305-*a* within the first SRS resource set. In the case of PUSCH transmission configuration 300-*b*, the UE may multiplex the one or more CSI reports 310-*c* with the PUSCH repetition 305-*e*, which may be the first (e.g., the earliest) PUSCH repetition 305-*e* within the first SRS resource set.

In a second example of the PUSCH transmission configurations 300, the base station may indicate, to a UE transmitting the PUSCH repetitions 305, that the one or more CSI reports 310 are to be multiplexed one of the PUSCH repetitions 305 associated with both the first SRS resource set and the second SRS resource set. Here, the UE may multiplex a first repetition of the one or more CSI reports 310 with an earliest PUSCH repetition 305 associated with the first SRS resource set and a second repetition of the one or more CSI reports 310 with an earliest PUSCH repetition 305 associated with the second SRS resource set. In the case of PUSCH transmission configuration 300-*a*, the UE may multiplex a first repetition of the one or more CSI reports 310-*a* with the PUSCH repetition 305-*a*, which may the first (e.g., the earliest) PUSCH repetition 305-*a* associated with the first SRS resource set. The UE may additionally multiplex a second repetition of the one or more CSI reports 310-*b* with the PUSCH repetition 305-*b*, which may be the first PUSCH repetition 305-*b* associated with the second SRS resource set. In the case of PUSCH transmission configuration 300-*b*, the UE may multiplex the one or more CSI reports 310-*c* with the PUSCH repetition 305-*e*, which may be the first (e.g., the earliest) PUSCH repetition 305-*e* within the first SRS resource set. The UE may additionally multiplex a second repetition of the one or more CSI reports 310-*c* with the PUSCH repetition 305-*g*, which may be the first PUSCH repetition 305-*g* associated with the second SRS resource set.

Figure 4:
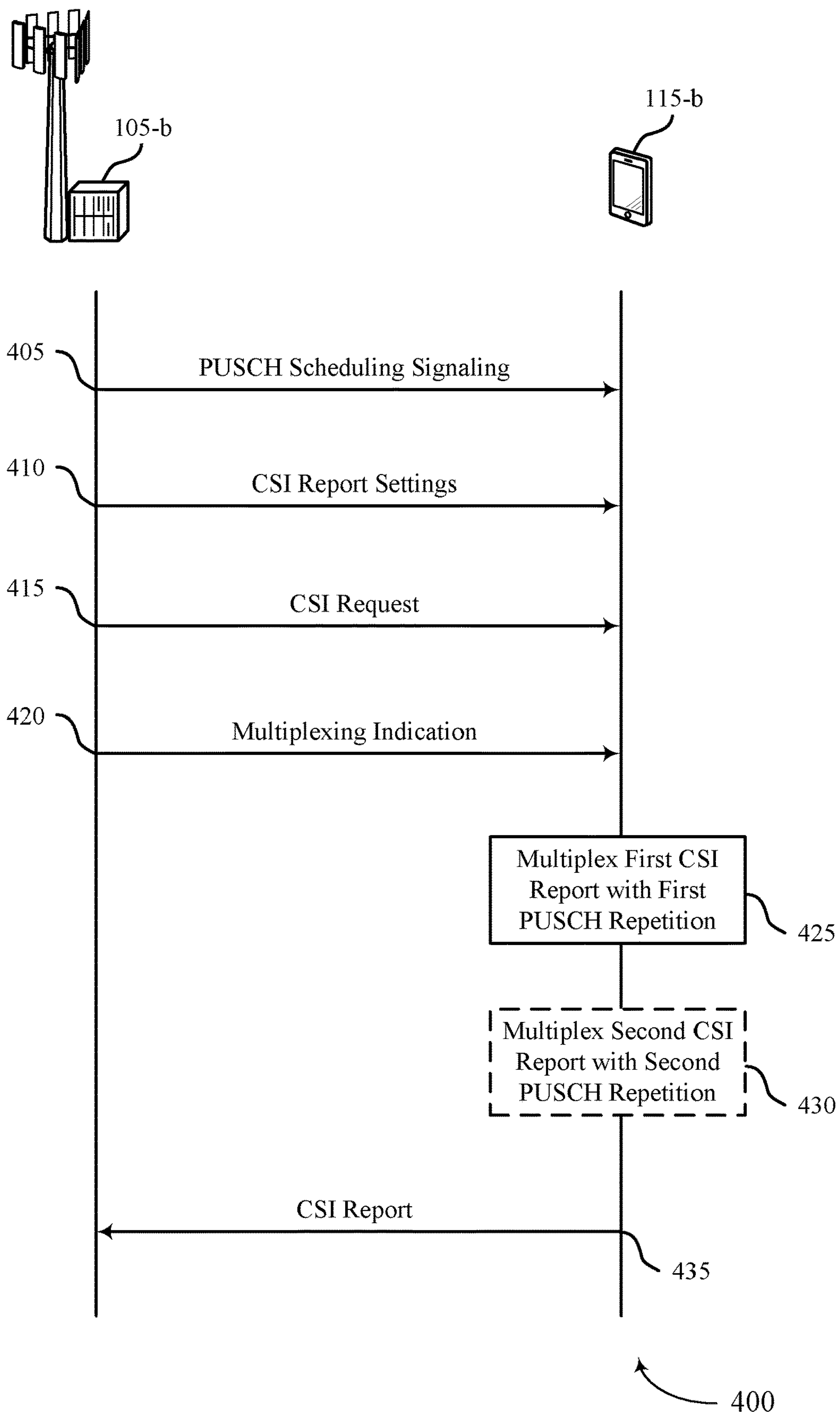
FIG. 4 illustrates an example of a process flow that supports aperiodic reporting of CSI in accordance with aspects of the present disclosure.

FIG. 4 illustrates an example of a process flow 400 that supports aperiodic reporting of CSI in accordance with aspects of the present disclosure. In some examples, the process flow 400 may implement aspects of FIGS. 1 through 3. For example, the UE 115-*b* may be an example of the UEs 115 as described with respect to FIGS. 1 through 3. Additionally or alternatively, the base station 105-*b* may be an example of the base stations 105 as described with respect to FIGS. 1 through 3.

At 405, the base station 105-*b* may transmit PUSCH scheduling signaling to the UE 115-*b*. For example, the base station 105-*b* may transmit signaling that schedules a first set of repetitions of a first uplink shared channel transmission (e.g., a first PUSCH transmission) associated with a first SRS resource set and a second set of repetitions of a second uplink shared channel transmission associated with a second SRS resource set. In some cases, the base station 105-*b* may transmit DCI scheduling the first and second sets of repetitions. Additionally or alternatively, the quantity of repetitions may be indicated by DCI or RRC signaling.

At 410, the base station 105-*b* may transmit CSI report settings to the UE 115-*b*. For example, the base station 105-*b* may transmit RRC signaling indicating a set of CSI report groups which are each associated with a trigger state. In some instances, the CSI reports associated with a given trigger state are to be multiplexed with one of the first set of repetitions or the second set of repetitions or with both of the first set of repetitions and the second set of repetitions based at least in part on the trigger state. Additionally or alternatively, the base station 105-*b* may transmit RRC signaling indicating a set of possible channel state information report settings (e.g., a set of CSI report groups).

At 415, the base station 105-*b* may transmit a CSI report request to the UE 115-*b*. For example, the UE 115-*b* may receive a request that the UE 115-*b* is to transmit one or more CSI reports. In some instances, the CSI report request may indicate one of the possible CSI report settings (e.g., configured at 410). In some examples, the base station 105-*b* may indicate the CSI report request by DCI scheduling that also schedules the first and second sets of repetitions.

At 420, the base station 105-*b* may transmit a multiplexing indication to the UE 115-*b*. For example, the UE 115-*b* may receive an indication that the one or more CSI reports are to be multiplexed with one of the first set of repetitions or the second set of repetitions or with both of the first set of repetitions and the second set of repetitions. In one example, the UE 115-*b* may receive the multiplexing indication by receiving RRC signaling indicating that the one or more CSI reports are to be multiplexed with one of the first set of repetitions or the second set of repetitions or with both of the first set of repetitions and the second set of repetitions. In another example, the UE 115-*b* may receive the multiplexing indication by receiving DCI indicating one of the trigger states (e.g., configured by RRC signaling at 410), where the DCI includes the request that the UE 115-*b* is to transmit one or more CSI reports and the multiplexing indication. In another example, the UE 115-*b* may receive the multiplexing indication by receiving DCI indicating that the one or more CSI reports are to be multiplexed with one of the first set of repetitions or the second set of repetitions or with both of the first set of repetitions and the second set of repetitions.

At 425, the UE 115-*b* may multiplex the one or more CSI reports with a first PUSCH repetition. For example, the UE 115-*b* may multiplex, based on receiving the indication, a first of the one or more CSI reports with a first repetition of the first uplink shared channel transmission within the first set of repetitions, where the first repetition is transmitted prior to remaining repetitions within the first set of repetitions. In some cases, the UE 115-*b* may multiplex the first of the one or more CSI reports with a first actual repetition associated with the first repetition that is transmitted prior to any other actual repetitions associated with the first repetition.

At 430, the UE 115-*b* may optionally multiplex the one or more CSI reports with a second PUSCH repetition. That is, in a case that the multiplexing indication indicates that the one or more CSI reports are to be multiplexed with one of the first set of repetitions or the second set of repetitions, the UE 115-*b* may not multiplex the one or more CSI reports with the second PUSCH repetition. For example, the UE 115-*b* may multiplex, based on receiving the indication that the one or more CSI reports are to be multiplexed with both of the first set of repetitions and the second set of repetitions, a second of the one or more CSI reports with a second repetition of the second uplink shared channel transmission within the second set of repetitions, where the second repetition is transmitted prior to remaining repetitions within the second set of repetitions. In some cases, the UE 115-*b* may multiplex the second of the one or more CSI reports with a second actual repetition associated with the second repetition that is transmitted prior to any other actual repetitions associated with the second repetition.

In some examples, a first quantity of coded modulation symbols including the first of the one or more CSI reports equals a second quantity of coded modulation symbols including the second of the one or more CSI reports. In one case, a first payload size of first UCI included in the first repetition of the first uplink shared channel transmission equals a second payload size of second UCI included in the second repetition of the second uplink shared channel transmission. Additionally or alternatively, the first quantity of coded modulation symbols equals the second quantity of coded modulation symbols based on the first payload size being equal to the second payload size. In some instances, the UE 115-*b* may determine the first quantity based on a payload size of UCI included in the first repetition of the first uplink shared channel transmission and may select the second quantity based on determining the first quantity.

At 435, the UE 115-*b* may transmit the one or more CSI reports to the base station 105-*b*. For example, the UE 115-*b* may transmit the one or more CSI reports in accordance with the multiplexing indication. In an example where the multiplexing indication indicates that the one or more CSI reports are to be multiplexed with both of the first set of repetitions and the second set of repetitions, the UE 115-*b* may transmit a first repetition of the first uplink shared channel transmission including a first of the one or more CSI reports via a first transmission beam associated with the first SRS resource set and may transmit a second repetition of the second uplink shared channel transmission including a second of the one or more CSI reports via a second transmission beam associated with the second SRS resource set.

In some cases, the UE 115-*b* may determine that a quantity of repetitions in the first set of repetitions and the second set of repetitions is two based on an absence of a transport block associate with the first uplink shared channel transmission and the second uplink shared channel transmission and receiving the multiplexing indication that the one or more CSI reports are to be multiplexed with both of the first set of repetitions and the second set of repetitions. Here, the UE 115-*b* may transmit the first and second CSI reports by multiplexing them with the two repetitions of the PUSCH transmissions.

Figure 5:
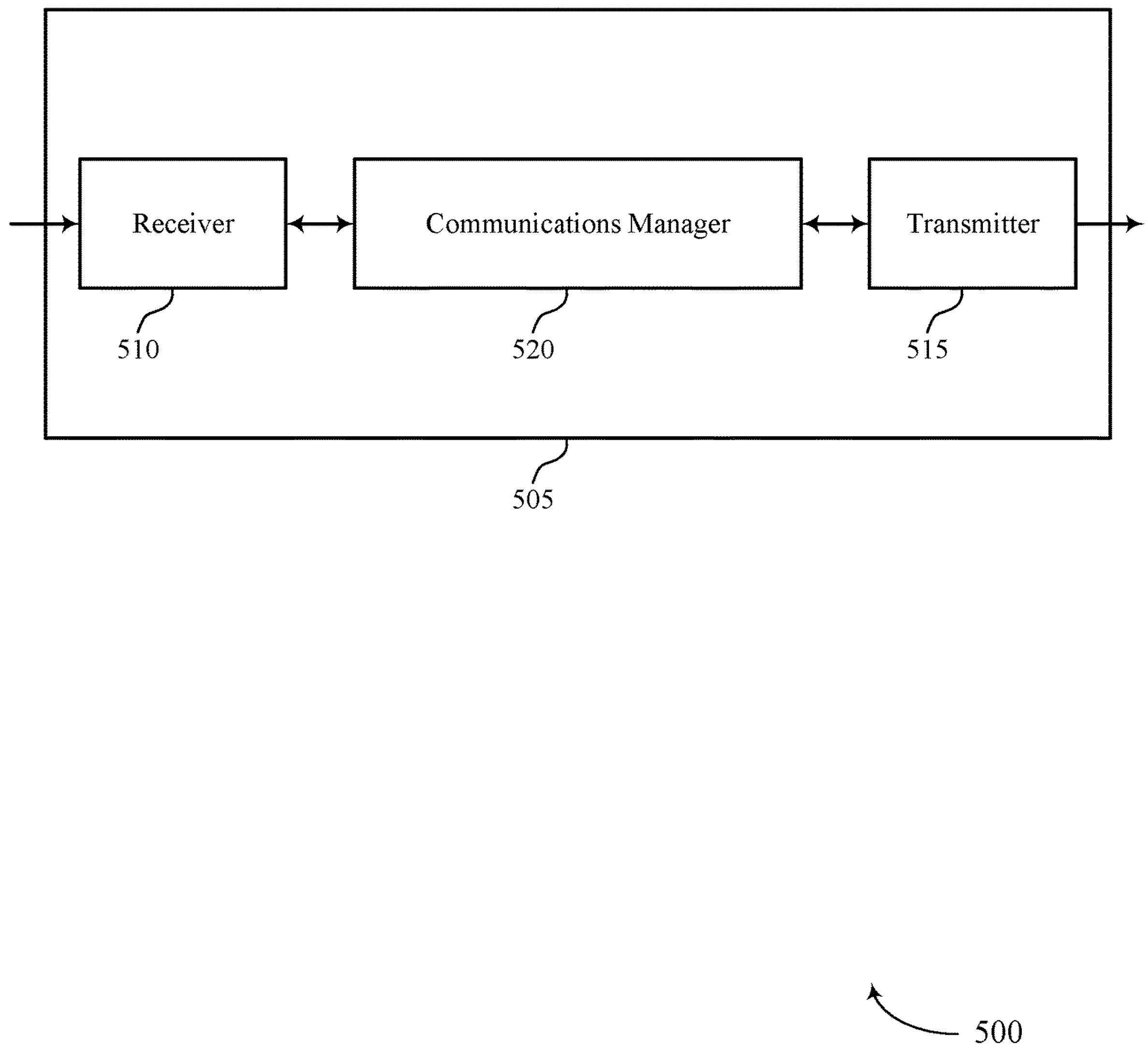
FIGS. 5 and 6 show block diagrams of devices that support aperiodic reporting of CSI in accordance with aspects of the present disclosure.

FIG. 5 shows a block diagram 500 of a device 505 that supports aperiodic reporting of CSI in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to aperiodic reporting of CSI). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to aperiodic reporting of CSI). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of aperiodic reporting of CSI as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, signaling that schedules a first set of repetitions of a first uplink shared channel transmission associated with a first SRS resource set and a second set of repetitions of a second uplink shared channel transmission associated with a second SRS resource set. The communications manager 520 may be configured as or otherwise support a means for receiving, from the base station, a request that the UE is to transmit one or more CSI reports. The communications manager 520 may be configured as or otherwise support a means for receiving, from the base station, an indication that the one or more CSI reports are to be multiplexed with one of the first set of repetitions or the second set of repetitions or with both of the first set of repetitions and the second set of repetitions. The communications manager 520 may be configured as or otherwise support a means for transmitting the one or more CSI reports in accordance with the indication.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for increased reliability.

Figure 6:
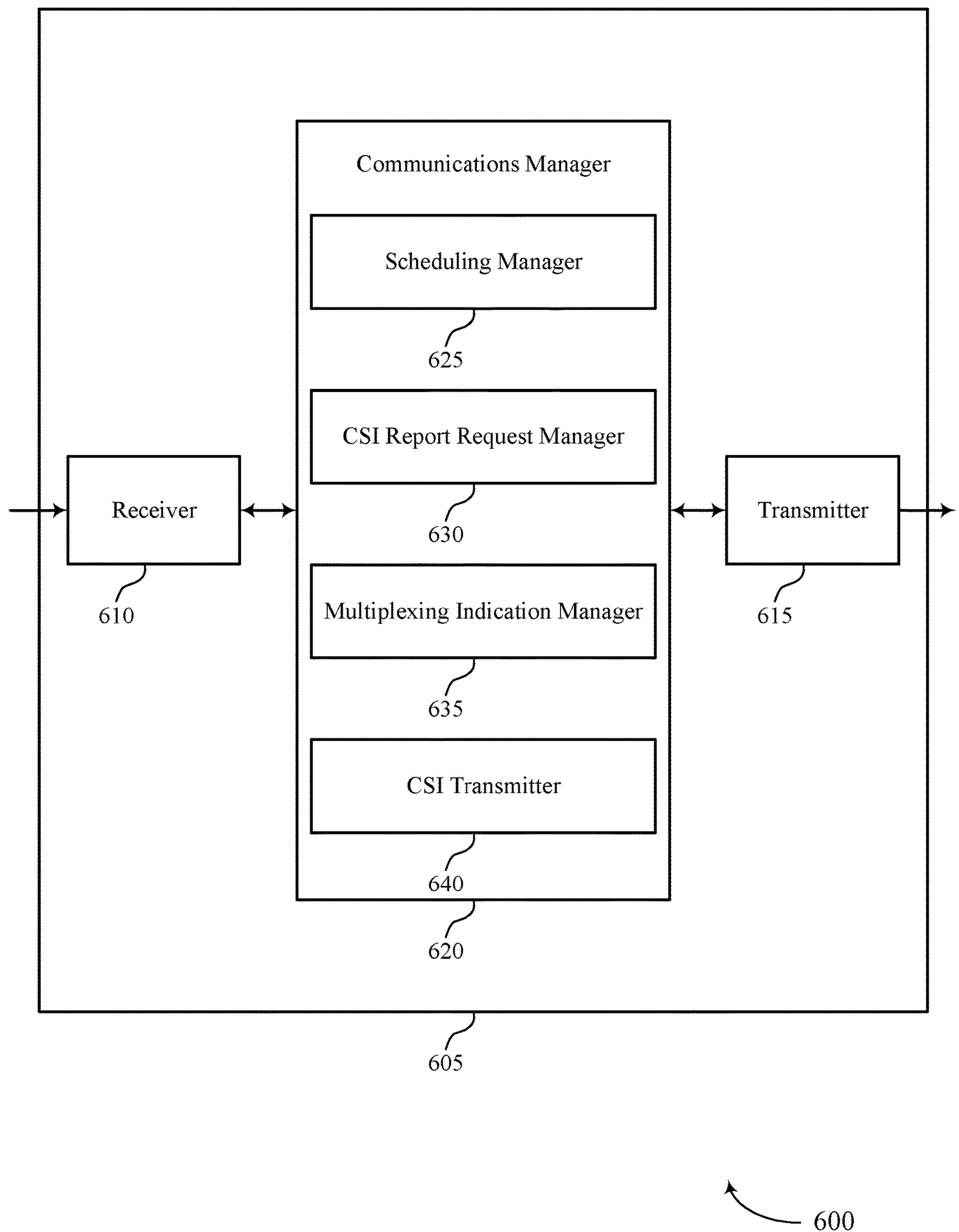

FIG. 6 shows a block diagram 600 of a device 605 that supports aperiodic reporting of CSI in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to aperiodic reporting of CSI). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to aperiodic reporting of CSI). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of aperiodic reporting of CSI as described herein. For example, the communications manager 620 may include a scheduling manager 625, a CSI report request manager 630, a multiplexing indication manager 635, a CSI transmitter 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The scheduling manager 625 may be configured as or otherwise support a means for receiving, from a base station, signaling that schedules a first set of repetitions of a first uplink shared channel transmission associated with a first SRS resource set and a second set of repetitions of a second uplink shared channel transmission associated with a second SRS resource set. The CSI report request manager 630 may be configured as or otherwise support a means for receiving, from the base station, a request that the UE is to transmit one or more CSI reports. The multiplexing indication manager 635 may be configured as or otherwise support a means for receiving, from the base station, an indication that the one or more CSI reports are to be multiplexed with one of the first set of repetitions or the second set of repetitions or with both of the first set of repetitions and the second set of repetitions. The CSI transmitter 640 may be configured as or otherwise support a means for transmitting the one or more CSI reports in accordance with the indication.

Figure 7:
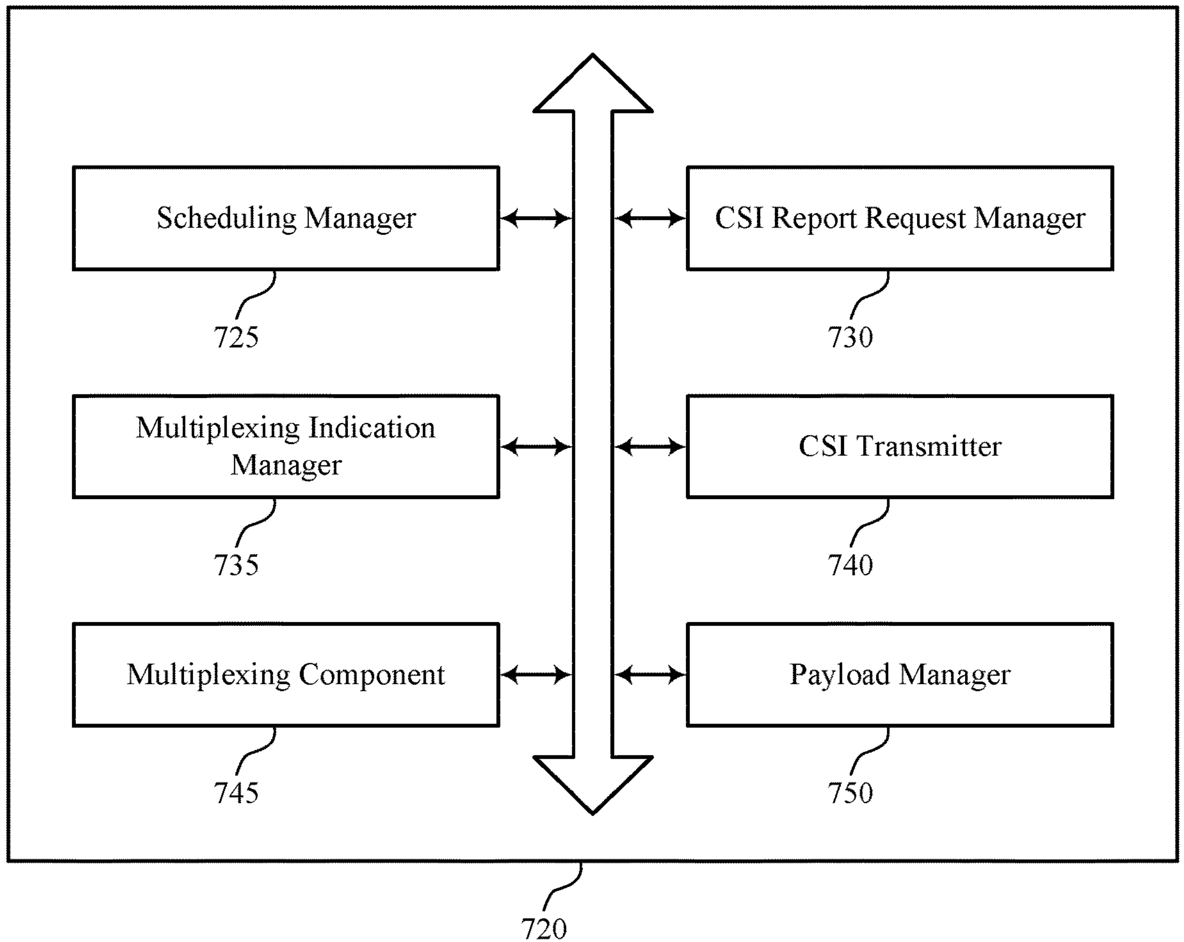
FIG. 7 shows a block diagram of a communications manager that supports aperiodic reporting of CSI in accordance with aspects of the present disclosure.

FIG. 7 shows a block diagram 700 of a communications manager 720 that supports aperiodic reporting of CSI in accordance with aspects of the present disclosure. The communications manager 720 may be an example of aspects of a communications manager 520, a communications manager 620, or both, as described herein. The communications manager 720, or various components thereof, may be an example of means for performing various aspects of aperiodic reporting of CSI as described herein. For example, the communications manager 720 may include a scheduling manager 725, a CSI report request manager 730, a multiplexing indication manager 735, a CSI transmitter 740, a multiplexing component 745, a payload manager 750, or any combination thereof. Each of these components may communicate, directly or indirectly, with one another (e.g., via one or more buses).

The communications manager 720 may support wireless communication at a UE in accordance with examples as disclosed herein. The scheduling manager 725 may be configured as or otherwise support a means for receiving, from a base station, signaling that schedules a first set of repetitions of a first uplink shared channel transmission associated with a first SRS resource set and a second set of repetitions of a second uplink shared channel transmission associated with a second SRS resource set. The CSI report request manager 730 may be configured as or otherwise support a means for receiving, from the base station, a request that the UE is to transmit one or more CSI reports. The multiplexing indication manager 735 may be configured as or otherwise support a means for receiving, from the base station, an indication that the one or more CSI reports are to be multiplexed with one of the first set of repetitions or the second set of repetitions or with both of the first set of repetitions and the second set of repetitions. The CSI transmitter 740 may be configured as or otherwise support a means for transmitting the one or more CSI reports in accordance with the indication.

In some examples, the multiplexing component 745 may be configured as or otherwise support a means for multiplexing, based on receiving the indication that the one or more CSI reports are to be multiplexed with both of the first set of repetitions and the second set of repetitions, a first of the one or more CSI reports with a first repetition of the first uplink shared channel transmission within the first set of repetitions, where the first repetition is transmitted prior to remaining repetitions within the first set of repetitions. In some examples, the multiplexing component 745 may be configured as or otherwise support a means for multiplexing a second of the one or more CSI reports with a second repetition of the second uplink shared channel transmission within the second set of repetitions, where the second repetition is transmitted prior to remaining repetitions within the second set of repetitions.

In some examples, multiplexing the first of the one or more CSI reports with the first repetition includes multiplexing the first of the one or more CSI reports with a first actual repetition associated with the first repetition that is transmitted prior to any other actual repetitions associated with the first repetition. In some examples, multiplexing the second of the one or more CSI reports with the first repetition includes multiplexing the second of the one or more CSI reports with a second actual repetition associated with the second repetition that is transmitted prior to any other actual repetitions associated with the second repetition.

In some examples, a first quantity of coded modulation symbols including the first of the one or more CSI reports equals a second quantity of coded modulation symbols including the second of the one or more CSI reports.

In some examples, a first payload size of first uplink control information included in the first repetition of the first uplink shared channel transmission equals a second payload size of second uplink control information included in the second repetition of the second uplink shared channel transmission. In some examples, the first quantity of coded modulation symbols equals the second quantity of coded modulation symbols based on the first payload size being equal to the second payload size.

In some examples, the payload manager 750 may be configured as or otherwise support a means for determining the first quantity based on a payload size of uplink control information included in the first repetition of the first uplink shared channel transmission. In some examples, the payload manager 750 may be configured as or otherwise support a means for selecting the second quantity based on determining the first quantity.

In some examples, the multiplexing component 745 may be configured as or otherwise support a means for multiplexing, based on receiving the indication that the one or more CSI reports are to be multiplexed with one of the first set of repetitions or the second set of repetitions, the one or more CSI reports with a repetition from the first set of repetitions or the second set of repetitions that is transmitted prior to remaining repetitions within the first set of repetitions and the second set of repetitions.

In some examples, to support transmitting the one or more CSI reports, the CSI transmitter 740 may be configured as or otherwise support a means for transmitting, based on receiving the indication that the one or more CSI reports are to be multiplexed with both of the first set of repetitions and the second set of repetitions, a first repetition of the first uplink shared channel transmission including a first of the one or more CSI reports via a first transmission beam associated with the first SRS resource set. In some examples, to support transmitting the one or more CSI reports, the CSI transmitter 740 may be configured as or otherwise support a means for transmitting a second repetition of the second uplink shared channel transmission including a second of the one or more CSI reports via a second transmission beam associated with the second SRS resource set.

In some examples, to support receiving the indication, the multiplexing indication manager 735 may be configured as or otherwise support a means for receiving RRC signaling indicating that the one or more CSI reports are to be multiplexed with one of the first set of repetitions or the second set of repetitions or with both of the first set of repetitions and the second set of repetitions.

In some examples, the scheduling manager 725 may be configured as or otherwise support a means for receiving, from the base station, RRC signaling indicating a set of multiple CSI report groups which are each associated with a trigger state, the CSI reports associated with a given trigger state are to be multiplexed with one of the first set of repetitions or the second set of repetitions or with both of the first set of repetitions and the second set of repetitions based on the trigger state. In some examples, the scheduling manager 725 may be configured as or otherwise support a means for receiving, from the base station, DCI indicating one of the trigger states, where the DCI includes the request that the UE is to transmit one or more CSI reports and the indication.

In some examples, to support receiving the indication, the multiplexing indication manager 735 may be configured as or otherwise support a means for receiving DCI indicating that the one or more CSI reports are to be multiplexed with one of the first set of repetitions or the second set of repetitions or with both of the first set of repetitions and the second set of repetitions.

In some examples, the scheduling manager 725 may be configured as or otherwise support a means for determining that a quantity of repetitions in the first set of repetitions and the second set of repetitions is two based on an absence of a transport block associate with the first uplink shared channel transmission and the second uplink shared channel transmission and receiving the indication that the one or more CSI reports are to be multiplexed with both of the first set of repetitions and the second set of repetitions.

In some examples, the scheduling manager 725 may be configured as or otherwise support a means for receiving, from the base station, RRC signaling indicating a set of possible CSI report settings, where the request that the UE is to transmit one or more CSI reports indicates one of the possible CSI report settings.

In some examples, to support receiving the signaling and receiving the request, the CSI report request manager 730 may be configured as or otherwise support a means for receiving DCI, where the DCI schedules the first set of repetitions and the second set of repetitions and requests that the UE is to transmit one or more CSI reports.

In some examples, to support receiving the signaling that schedules the first set of repetitions and the second set of repetitions, the scheduling manager 725 may be configured as or otherwise support a means for receiving DCI or RRC signaling indicating a quantity of repetitions in the first set of repetitions and the second set of repetitions.

Figure 8:
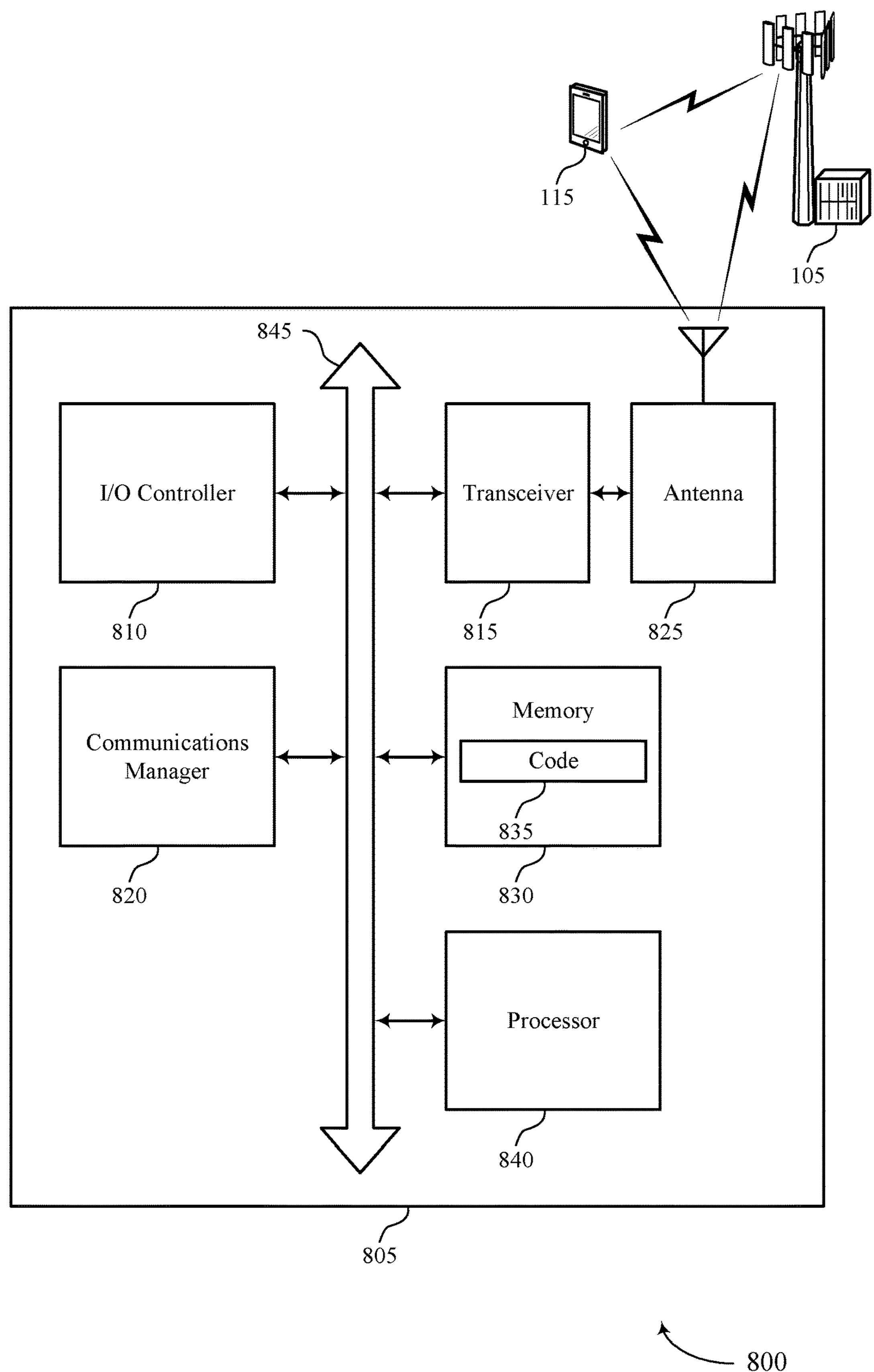
FIG. 8 shows a diagram of a system including a device that supports aperiodic reporting of CSI in accordance with aspects of the present disclosure.

FIG. 8 shows a diagram of a system 800 including a device 805 that supports aperiodic reporting of CSI in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting aperiodic reporting of CSI). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, signaling that schedules a first set of repetitions of a first uplink shared channel transmission associated with a first SRS resource set and a second set of repetitions of a second uplink shared channel transmission associated with a second SRS resource set. The communications manager 820 may be configured as or otherwise support a means for receiving, from the base station, a request that the UE is to transmit one or more CSI reports. The communications manager 820 may be configured as or otherwise support a means for receiving, from the base station, an indication that the one or more CSI reports are to be multiplexed with one of the first set of repetitions or the second set of repetitions or with both of the first set of repetitions and the second set of repetitions. The communications manager 820 may be configured as or otherwise support a means for transmitting the one or more CSI reports in accordance with the indication.

By including or configuring the communications manager 820 in accordance with examples as described herein, the device 805 may support techniques for improved communication reliability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of aperiodic reporting of CSI as described herein, or the processor 840 and the memory 830 may be otherwise configured to perform or support such operations.

Figure 9:
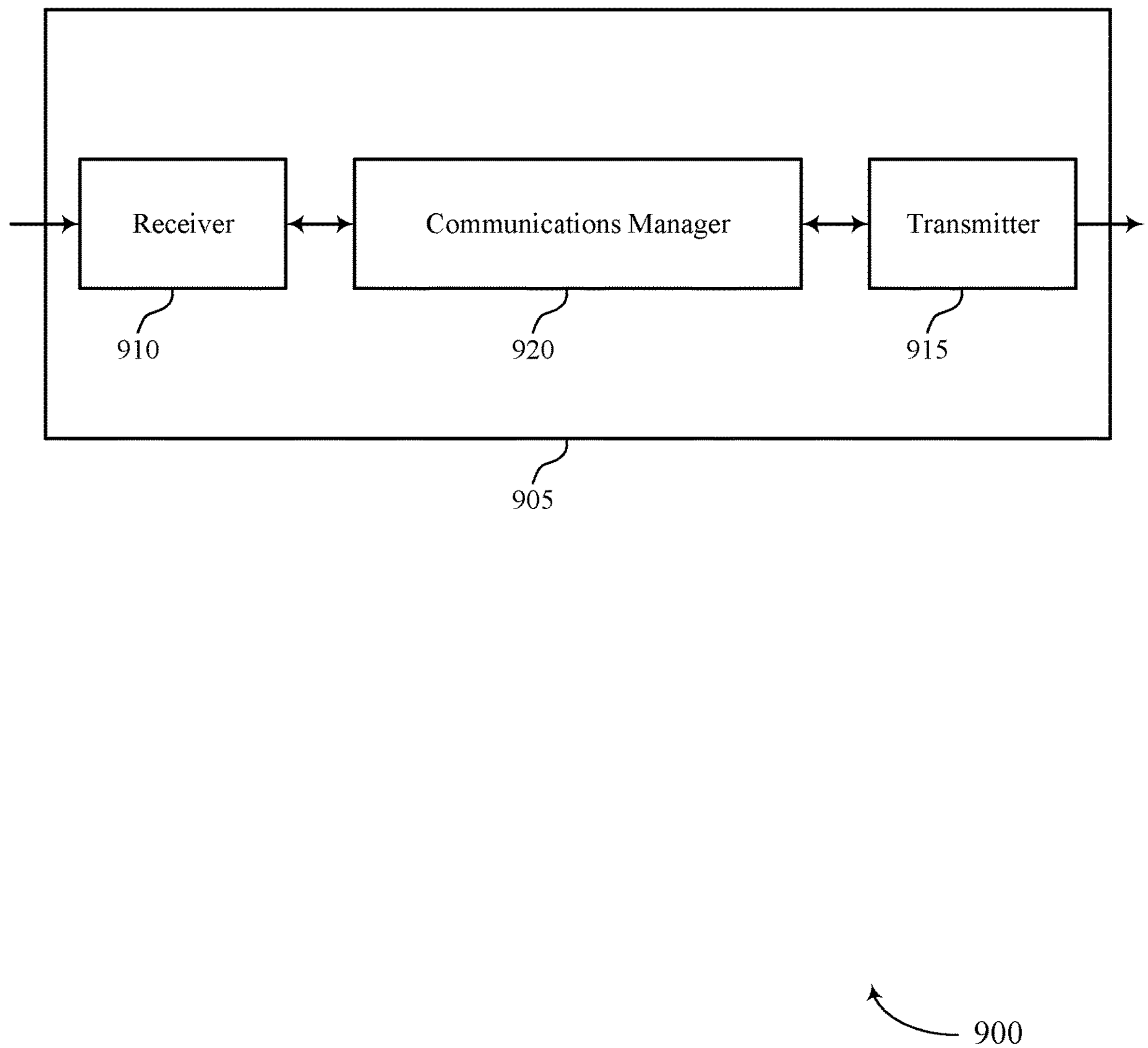
FIGS. 9 and 10 show block diagrams of devices that support aperiodic reporting of CSI in accordance with aspects of the present disclosure.

FIG. 9 shows a block diagram 900 of a device 905 that supports aperiodic reporting of CSI in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to aperiodic reporting of CSI). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to aperiodic reporting of CSI). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of aperiodic reporting of CSI as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, signaling that schedules a first set of repetitions of a first uplink shared channel transmission associated with a first SRS resource set and a second set of repetitions of a second uplink shared channel transmission associated with a second SRS resource set. The communications manager 920 may be configured as or otherwise support a means for transmitting, to the UE, a request that the UE is to transmit one or more CSI reports. The communications manager 920 may be configured as or otherwise support a means for transmitting, to the UE, an indication that the one or more CSI reports are to be multiplexed with one of the first set of repetitions or the second set of repetitions or with both of the first set of repetitions and the second set of repetitions. The communications manager 920 may be configured as or otherwise support a means for receiving the one or more CSI reports in accordance with the indication.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for increased reliability.

Figure 10:
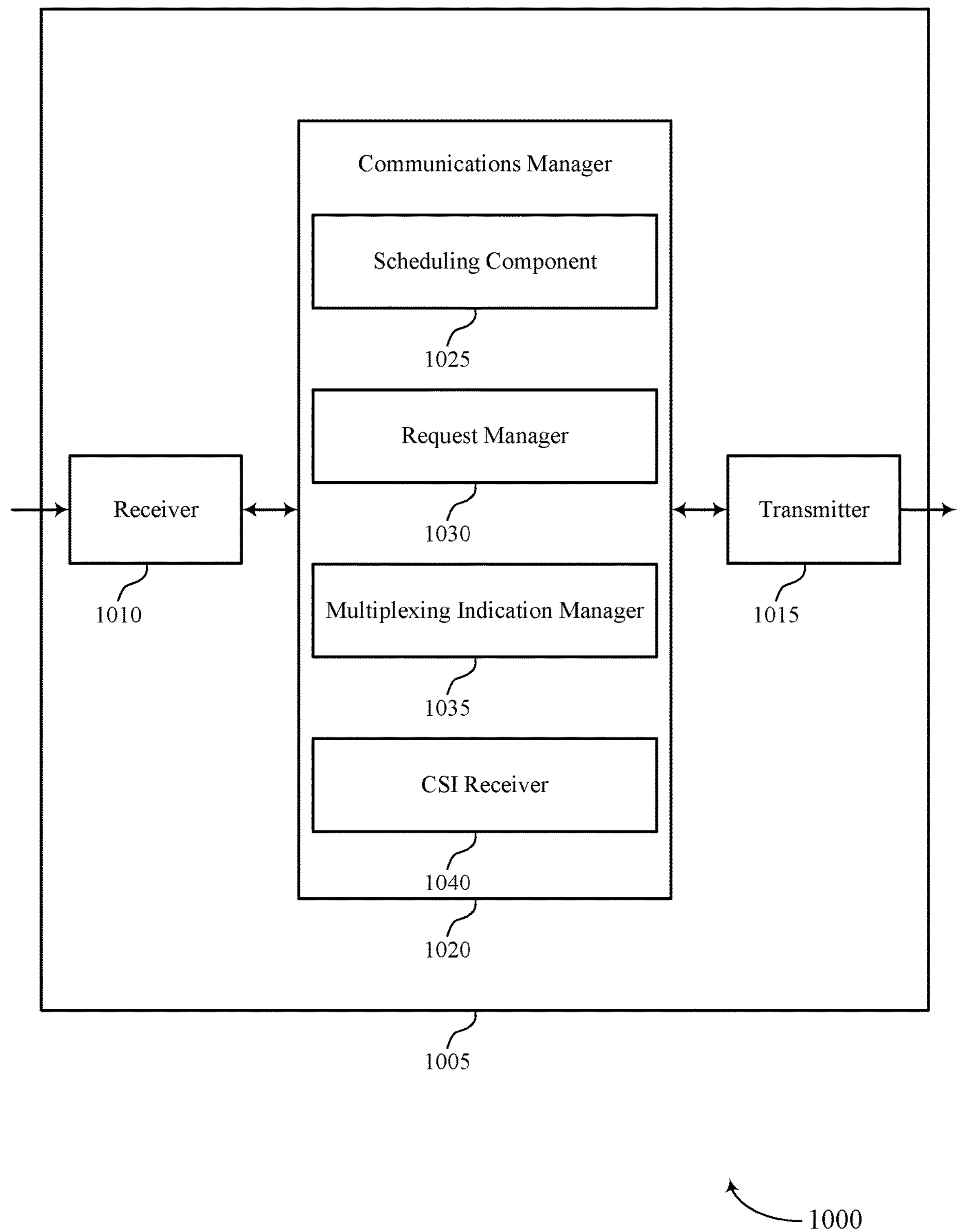

FIG. 10 shows a block diagram 1000 of a device 1005 that supports aperiodic reporting of CSI in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to aperiodic reporting of CSI). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to aperiodic reporting of CSI). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of aperiodic reporting of CSI as described herein. For example, the communications manager 1020 may include a scheduling component 1025, a request manager 1030, a multiplexing indication manager 1035, a CSI receiver 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The scheduling component 1025 may be configured as or otherwise support a means for transmitting, to a UE, signaling that schedules a first set of repetitions of a first uplink shared channel transmission associated with a first SRS resource set and a second set of repetitions of a second uplink shared channel transmission associated with a second SRS resource set. The request manager 1030 may be configured as or otherwise support a means for transmitting, to the UE, a request that the UE is to transmit one or more CSI reports. The multiplexing indication manager 1035 may be configured as or otherwise support a means for transmitting, to the UE, an indication that the one or more CSI reports are to be multiplexed with one of the first set of repetitions or the second set of repetitions or with both of the first set of repetitions and the second set of repetitions. The CSI receiver 1040 may be configured as or otherwise support a means for receiving the one or more CSI reports in accordance with the indication.

Figure 11:
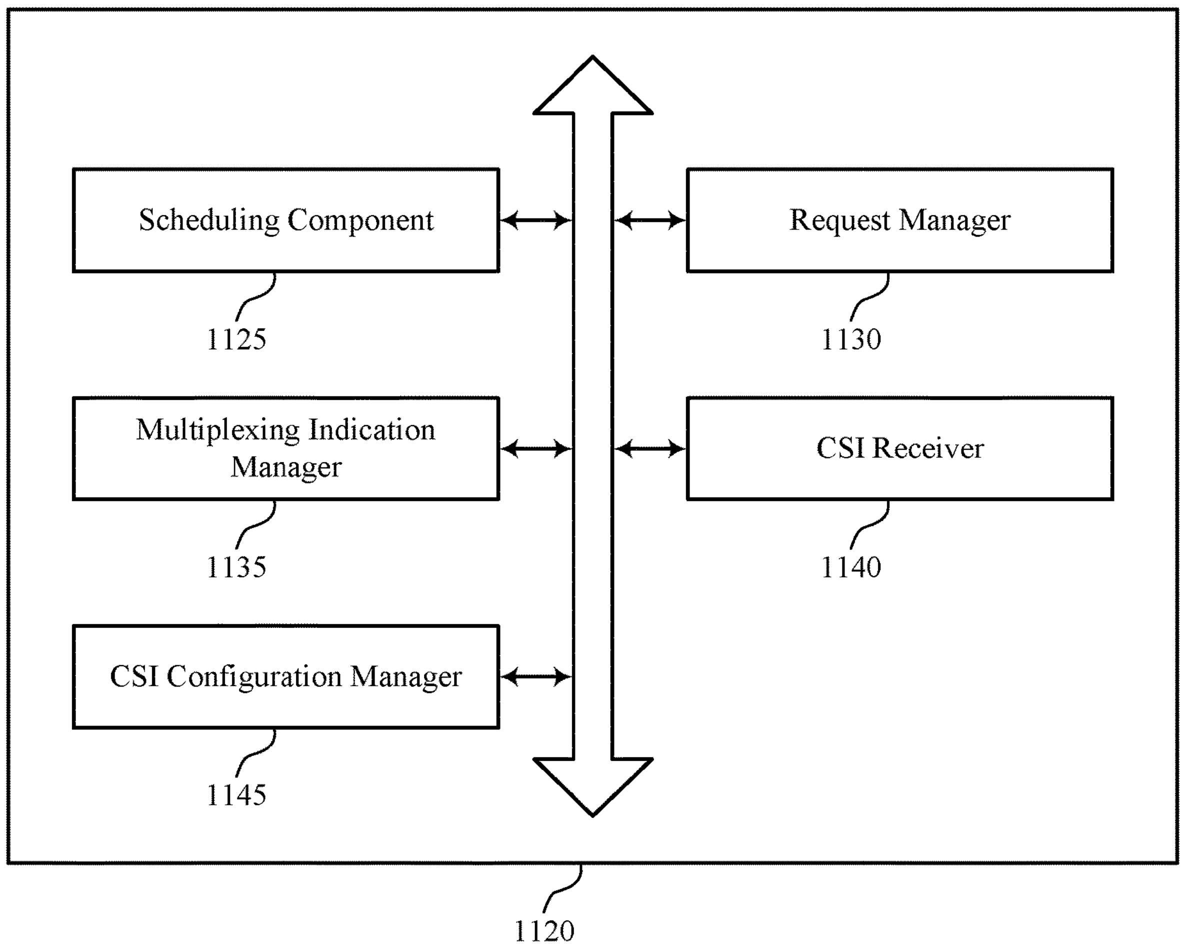
FIG. 11 shows a block diagram of a communications manager that supports aperiodic reporting of CSI in accordance with aspects of the present disclosure.

FIG. 11 shows a block diagram 1100 of a communications manager 1120 that supports aperiodic reporting of CSI in accordance with aspects of the present disclosure. The communications manager 1120 may be an example of aspects of a communications manager 920, a communications manager 1020, or both, as described herein. The communications manager 1120, or various components thereof, may be an example of means for performing various aspects of aperiodic reporting of CSI as described herein. For example, the communications manager 1120 may include a scheduling component 1125, a request manager 1130, a multiplexing indication manager 1135, a CSI receiver 1140, a CSI configuration manager 1145, or any combination thereof. Each of these components may communicate, directly or indirectly, with one another (e.g., via one or more buses).

The communications manager 1120 may support wireless communication at a base station in accordance with examples as disclosed herein. The scheduling component 1125 may be configured as or otherwise support a means for transmitting, to a UE, signaling that schedules a first set of repetitions of a first uplink shared channel transmission associated with a first SRS resource set and a second set of repetitions of a second uplink shared channel transmission associated with a second SRS resource set. The request manager 1130 may be configured as or otherwise support a means for transmitting, to the UE, a request that the UE is to transmit one or more CSI reports. The multiplexing indication manager 1135 may be configured as or otherwise support a means for transmitting, to the UE, an indication that the one or more CSI reports are to be multiplexed with one of the first set of repetitions or the second set of repetitions or with both of the first set of repetitions and the second set of repetitions. The CSI receiver 1140 may be configured as or otherwise support a means for receiving the one or more CSI reports in accordance with the indication.

In some examples, the CSI receiver 1140 may be configured as or otherwise support a means for receiving, based on transmitting the indication that the one or more CSI reports are to be multiplexed with both of the first set of repetitions and the second set of repetitions, a first of the one or more CSI reports with a first repetition of the first uplink shared channel transmission within the first set of repetitions, where the first repetition is received prior to remaining repetitions within the first set of repetitions. In some examples, the CSI receiver 1140 may be configured as or otherwise support a means for receiving a second of the one or more CSI reports with a second repetition of the second uplink shared channel transmission within the second set of repetitions, where the second repetition is received prior to remaining repetitions within the second set of repetitions.

In some examples, receiving the first of the one or more CSI reports with the first repetition includes receiving the first of the one or more CSI reports with a first actual repetition associated with the first repetition that is received prior to any other actual repetitions associated with the first repetition. In some examples, receiving the second of the one or more CSI reports with the first repetition includes receiving the second of the one or more CSI reports with a second actual repetition associated with the second repetition that is received prior to any other actual repetitions associated with the second repetition.

In some examples, a first quantity of coded modulation symbols including the first of the one or more CSI reports equals a second quantity of coded modulation symbols including the second of the one or more CSI reports.

In some examples, a first payload size of first uplink control information included in the first repetition of the first uplink shared channel transmission equals a second payload size of second uplink control information included in the second repetition of the second uplink shared channel transmission. In some examples, the first quantity of coded modulation symbols equals the second quantity of coded modulation symbols based on the first payload size being equal to the second payload size.

In some examples, the CSI receiver 1140 may be configured as or otherwise support a means for receiving, based on transmitting the indication that the one or more CSI reports are to be multiplexed with one of the first set of repetitions or the second set of repetitions, the one or more CSI reports with a repetition from the first set of repetitions or the second set of repetitions that is received prior to remaining repetitions within the first set of repetitions and the second set of repetitions.

In some examples, to support receiving the one or more CSI reports, the CSI receiver 1140 may be configured as or otherwise support a means for receiving, based on transmitting the indication that the one or more CSI reports are to be multiplexed with both of the first set of repetitions and the second set of repetitions, a first repetition of the first uplink shared channel transmission including a first of the one or more CSI reports via a first transmission beam associated with the first SRS resource set. In some examples, to support receiving the one or more CSI reports, the CSI receiver 1140 may be configured as or otherwise support a means for receiving a second repetition of the second uplink shared channel transmission including a second of the one or more CSI reports via a second transmission beam associated with the second SRS resource set.

In some examples, to support transmitting the indication, the multiplexing indication manager 1135 may be configured as or otherwise support a means for transmitting RRC signaling indicating that the one or more CSI reports are to be multiplexed with one of the first set of repetitions or the second set of repetitions or with both of the first set of repetitions and the second set of repetitions.

In some examples, the CSI configuration manager 1145 may be configured as or otherwise support a means for transmitting, to the UE, RRC signaling indicating a set of multiple CSI report groups which are each associated with a trigger state, the CSI reports associated with a given trigger state are to be multiplexed, by the UE, with one of the first set of repetitions or the second set of repetitions or with both of the first set of repetitions and the second set of repetitions based on the trigger state. In some examples, the request manager 1130 may be configured as or otherwise support a means for transmitting, to the UE, DCI indicating one of the trigger states, where the DCI includes the request that the UE is to transmit one or more CSI reports and the indication.

In some examples, to support transmitting the indication, the multiplexing indication manager 1135 may be configured as or otherwise support a means for transmitting DCI indicating that the one or more CSI reports are to be multiplexed with one of the first set of repetitions or the second set of repetitions or with both of the first set of repetitions and the second set of repetitions.

In some examples, a quantity of repetitions in the first set of repetitions and the second set of repetitions is two based on an absence of a transport block associate with the first uplink shared channel transmission and the second uplink shared channel transmission and transmitting the indication that the one or more CSI reports are to be multiplexed with both of the first set of repetitions and the second set of repetitions.

In some examples, the CSI configuration manager 1145 may be configured as or otherwise support a means for transmitting, to the UE, RRC signaling indicating a set of possible CSI report settings, where the request that the UE is to transmit one or more CSI reports indicates one of the possible CSI report settings.

In some examples, to support transmitting the signaling and transmitting the request, the request manager 1130 may be configured as or otherwise support a means for transmitting DCI, where the DCI schedules the first set of repetitions and the second set of repetitions and requests that the UE is to transmit one or more CSI reports.

In some examples, to support transmitting the signaling, the scheduling component 1125 may be configured as or otherwise support a means for transmitting DCI or RRC signaling indicating a quantity of repetitions in the first set of repetitions and the second set of repetitions.

Figure 12:
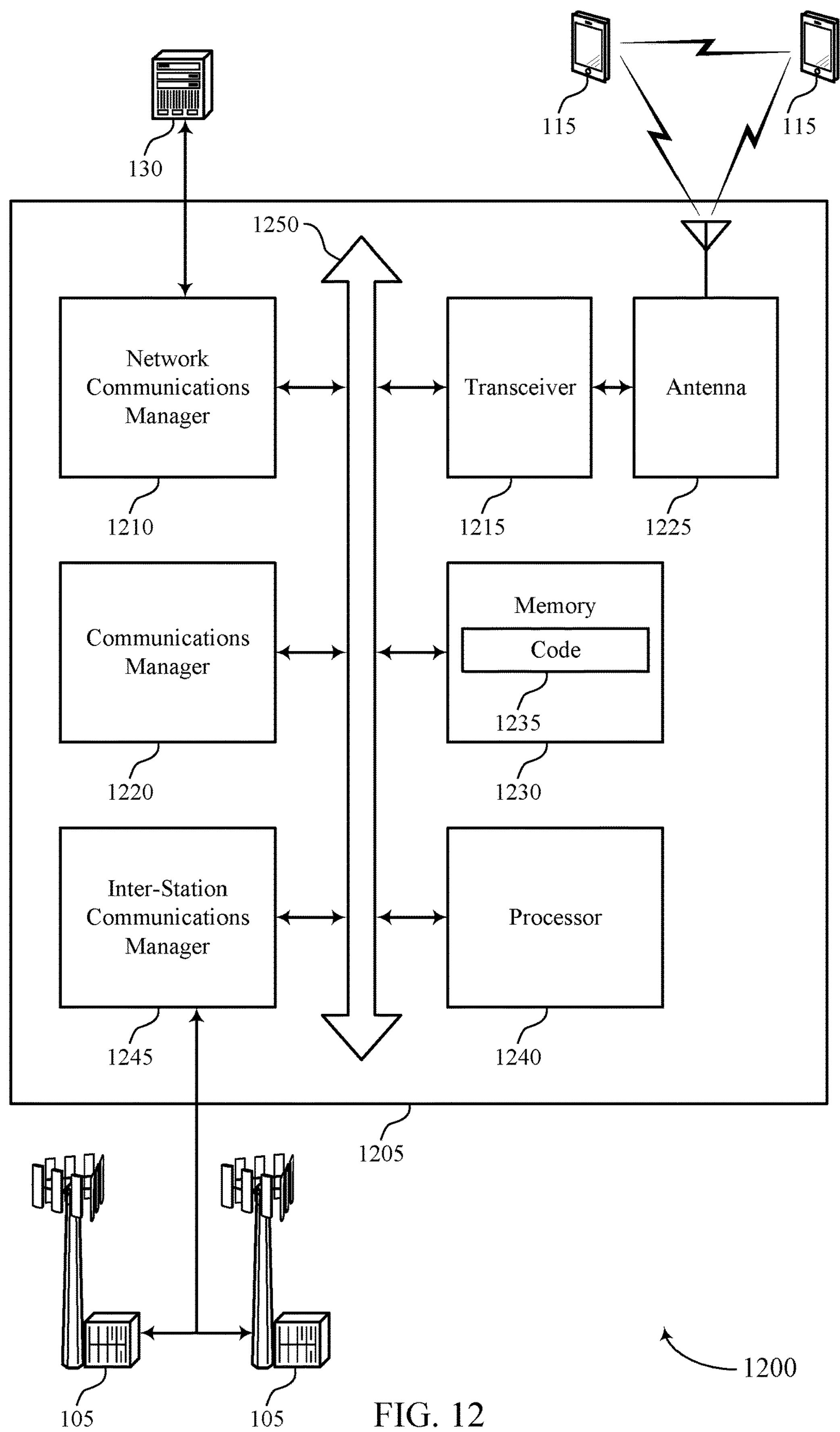
FIG. 12 shows a diagram of a system including a device that supports aperiodic reporting of CSI in accordance with aspects of the present disclosure.

FIG. 12 shows a diagram of a system 1200 including a device 1205 that supports aperiodic reporting of CSI in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting aperiodic reporting of CSI). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, signaling that schedules a first set of repetitions of a first uplink shared channel transmission associated with a first SRS resource set and a second set of repetitions of a second uplink shared channel transmission associated with a second SRS resource set. The communications manager 1220 may be configured as or otherwise support a means for transmitting, to the UE, a request that the UE is to transmit one or more CSI reports. The communications manager 1220 may be configured as or otherwise support a means for transmitting, to the UE, an indication that the one or more CSI reports are to be multiplexed with one of the first set of repetitions or the second set of repetitions or with both of the first set of repetitions and the second set of repetitions. The communications manager 1220 may be configured as or otherwise support a means for receiving the one or more CSI reports in accordance with the indication.

By including or configuring the communications manager 1220 in accordance with examples as described herein, the device 1205 may support techniques for improved communication reliability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of aperiodic reporting of CSI as described herein, or the processor 1240 and the memory 1230 may be otherwise configured to perform or support such operations.

Figure 13:
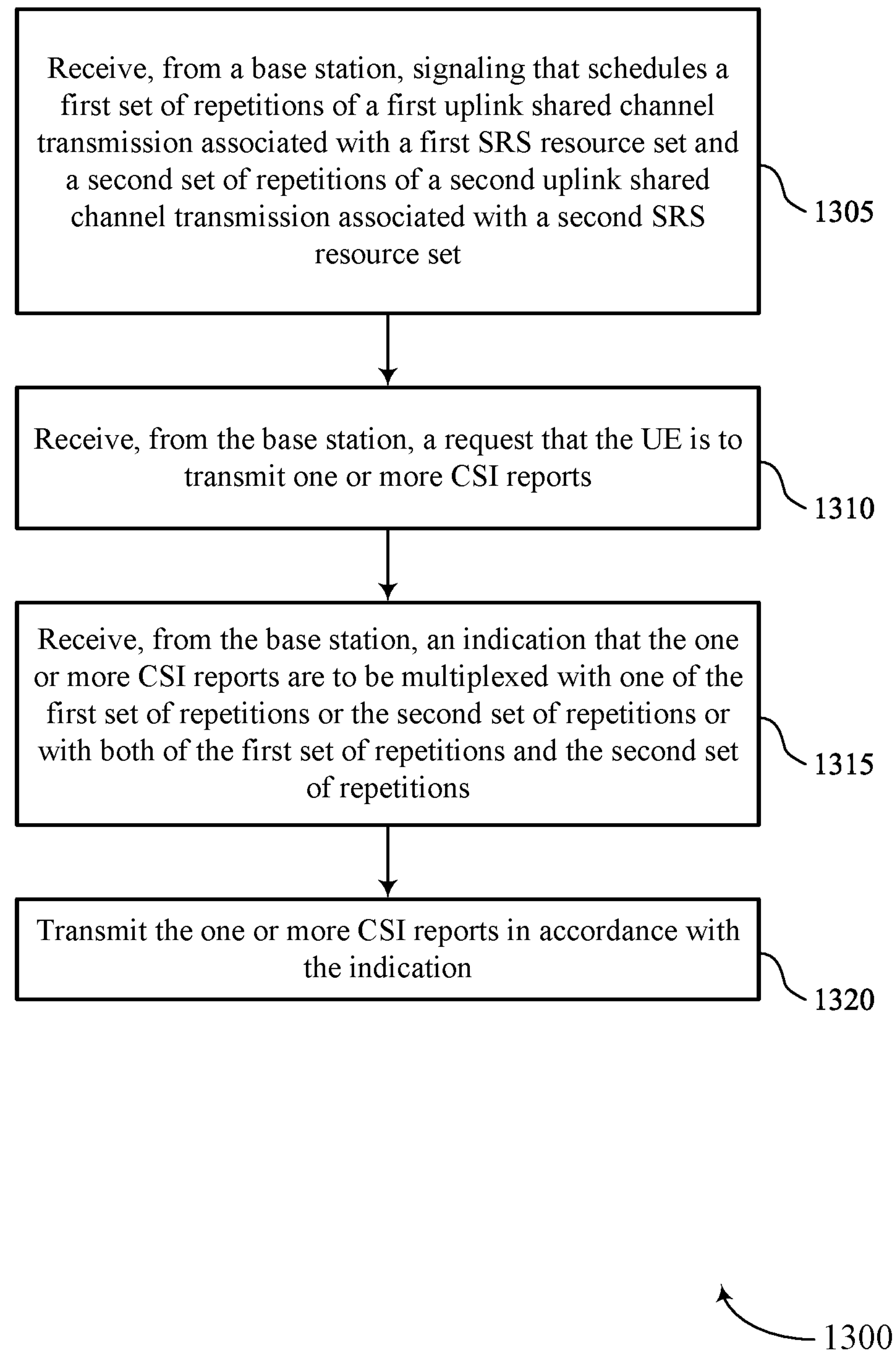
FIGS. 13 through 16 show flowcharts illustrating methods that support aperiodic reporting of CSI in accordance with aspects of the present disclosure.

FIG. 13 shows a flowchart illustrating a method 1300 that supports aperiodic reporting of CSI in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, signaling that schedules a first set of repetitions of a first uplink shared channel transmission associated with a first SRS resource set and a second set of repetitions of a second uplink shared channel transmission associated with a second SRS resource set. The operations of 1305 may be performed in accordance with examples as disclosed herein. In some examples, aspects of the operations of 1305 may be performed by a scheduling manager 725 as described with reference to FIG. 7.

At 1310, the method may include receiving, from the base station, a request that the UE is to transmit one or more CSI reports. The operations of 1310 may be performed in accordance with examples as disclosed herein. In some examples, aspects of the operations of 1310 may be performed by a CSI report request manager 730 as described with reference to FIG. 7.

At 1315, the method may include receiving, from the base station, an indication that the one or more CSI reports are to be multiplexed with one of the first set of repetitions or the second set of repetitions or with both of the first set of repetitions and the second set of repetitions. The operations of 1315 may be performed in accordance with examples as disclosed herein. In some examples, aspects of the operations of 1315 may be performed by a multiplexing indication manager 735 as described with reference to FIG. 7.

At 1320, the method may include transmitting the one or more CSI reports in accordance with the indication. The operations of 1320 may be performed in accordance with examples as disclosed herein. In some examples, aspects of the operations of 1320 may be performed by a CSI transmitter 740 as described with reference to FIG. 7.

Figure 14:
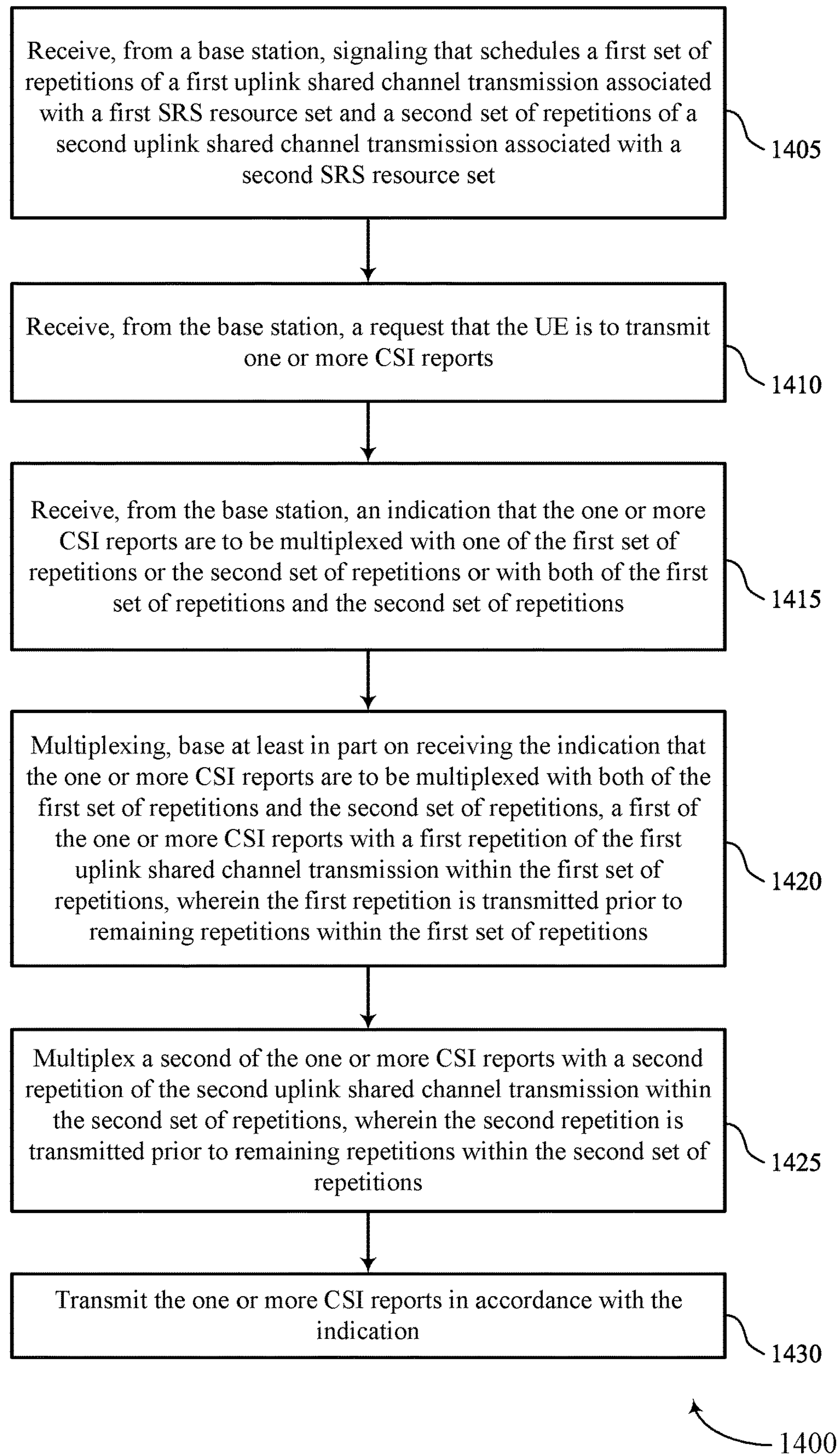

FIG. 14 shows a flowchart illustrating a method 1400 that supports aperiodic reporting of CSI in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, signaling that schedules a first set of repetitions of a first uplink shared channel transmission associated with a first SRS resource set and a second set of repetitions of a second uplink shared channel transmission associated with a second SRS resource set. The operations of 1405 may be performed in accordance with examples as disclosed herein. In some examples, aspects of the operations of 1405 may be performed by a scheduling manager 725 as described with reference to FIG. 7.

At 1410, the method may include receiving, from the base station, a request that the UE is to transmit one or more CSI reports. The operations of 1410 may be performed in accordance with examples as disclosed herein. In some examples, aspects of the operations of 1410 may be performed by a CSI report request manager 730 as described with reference to FIG. 7.

At 1415, the method may include receiving, from the base station, an indication that the one or more CSI reports are to be multiplexed with one of the first set of repetitions or the second set of repetitions or with both of the first set of repetitions and the second set of repetitions. The operations of 1415 may be performed in accordance with examples as disclosed herein. In some examples, aspects of the operations of 1415 may be performed by a multiplexing indication manager 735 as described with reference to FIG. 7.

At 1420, the method may include multiplexing, based on receiving the indication that the one or more CSI reports are to be multiplexed with both of the first set of repetitions and the second set of repetitions, a first of the one or more CSI reports with a first repetition of the first uplink shared channel transmission within the first set of repetitions, where the first repetition is transmitted prior to remaining repetitions within the first set of repetitions. The operations of 1420 may be performed in accordance with examples as disclosed herein. In some examples, aspects of the operations of 1420 may be performed by a multiplexing component 745 as described with reference to FIG. 7.

At 1425, the method may include multiplexing a second of the one or more CSI reports with a second repetition of the second uplink shared channel transmission within the second set of repetitions, where the second repetition is transmitted prior to remaining repetitions within the second set of repetitions. The operations of 1425 may be performed in accordance with examples as disclosed herein. In some examples, aspects of the operations of 1425 may be performed by a multiplexing component 745 as described with reference to FIG. 7.

At 1430, the method may include transmitting the one or more CSI reports in accordance with the indication. The operations of 1430 may be performed in accordance with examples as disclosed herein. In some examples, aspects of the operations of 1430 may be performed by a CSI transmitter 740 as described with reference to FIG. 7.

Figure 15:
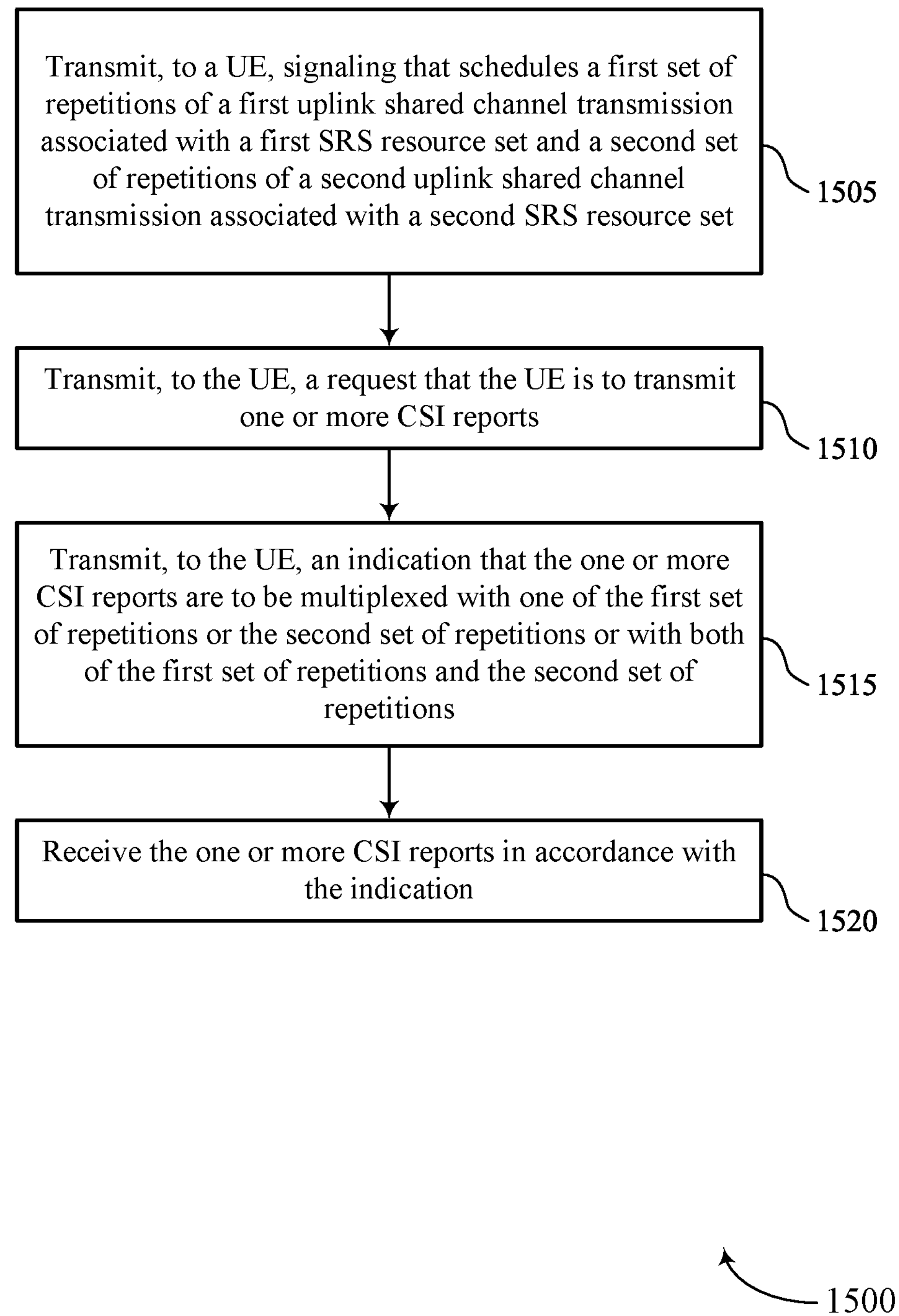

FIG. 15 shows a flowchart illustrating a method 1500 that supports aperiodic reporting of CSI in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, signaling that schedules a first set of repetitions of a first uplink shared channel transmission associated with a first SRS resource set and a second set of repetitions of a second uplink shared channel transmission associated with a second SRS resource set. The operations of 1505 may be performed in accordance with examples as disclosed herein. In some examples, aspects of the operations of 1505 may be performed by a scheduling component 1125 as described with reference to FIG. 11.

At 1510, the method may include transmitting, to the UE, a request that the UE is to transmit one or more CSI reports. The operations of 1510 may be performed in accordance with examples as disclosed herein. In some examples, aspects of the operations of 1510 may be performed by a request manager 1130 as described with reference to FIG. 11.

At 1515, the method may include transmitting, to the UE, an indication that the one or more CSI reports are to be multiplexed with one of the first set of repetitions or the second set of repetitions or with both of the first set of repetitions and the second set of repetitions. The operations of 1515 may be performed in accordance with examples as disclosed herein. In some examples, aspects of the operations of 1515 may be performed by a multiplexing indication manager 1135 as described with reference to FIG. 11.

At 1520, the method may include receiving the one or more CSI reports in accordance with the indication. The operations of 1520 may be performed in accordance with examples as disclosed herein. In some examples, aspects of the operations of 1520 may be performed by a CSI receiver 1140 as described with reference to FIG. 11.

Figure 16:
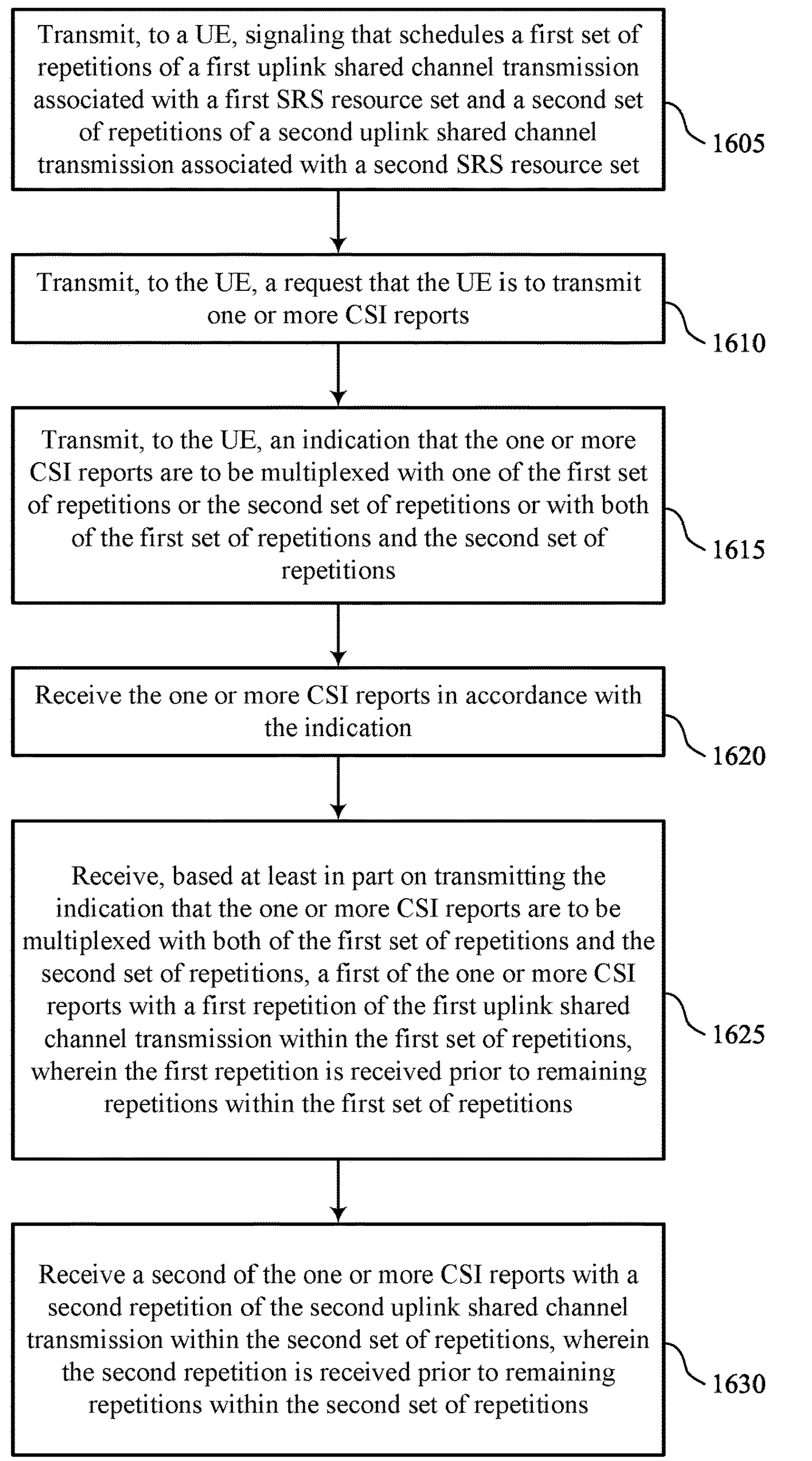

FIG. 16 shows a flowchart illustrating a method 1600 that supports aperiodic reporting of CSI in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, signaling that schedules a first set of repetitions of a first uplink shared channel transmission associated with a first SRS resource set and a second set of repetitions of a second uplink shared channel transmission associated with a second SRS resource set. The operations of 1605 may be performed in accordance with examples as disclosed herein. In some examples, aspects of the operations of 1605 may be performed by a scheduling component 1125 as described with reference to FIG. 11.

At 1610, the method may include transmitting, to the UE, a request that the UE is to transmit one or more CSI reports. The operations of 1610 may be performed in accordance with examples as disclosed herein. In some examples, aspects of the operations of 1610 may be performed by a request manager 1130 as described with reference to FIG. 11.

At 1615, the method may include transmitting, to the UE, an indication that the one or more CSI reports are to be multiplexed with one of the first set of repetitions or the second set of repetitions or with both of the first set of repetitions and the second set of repetitions. The operations of 1615 may be performed in accordance with examples as disclosed herein. In some examples, aspects of the operations of 1615 may be performed by a multiplexing indication manager 1135 as described with reference to FIG. 11.

At 1620, the method may include receiving the one or more CSI reports in accordance with the indication. The operations of 1620 may be performed in accordance with examples as disclosed herein. In some examples, aspects of the operations of 1620 may be performed by a CSI receiver 1140 as described with reference to FIG. 11.

At 1625, the method may include receiving, based on transmitting the indication that the one or more CSI reports are to be multiplexed with both of the first set of repetitions and the second set of repetitions, a first of the one or more CSI reports with a first repetition of the first uplink shared channel transmission within the first set of repetitions, where the first repetition is received prior to remaining repetitions within the first set of repetitions. The operations of 1625 may be performed in accordance with examples as disclosed herein. In some examples, aspects of the operations of 1625 may be performed by a CSI receiver 1140 as described with reference to FIG. 11.

At 1630, the method may include receiving a second of the one or more CSI reports with a second repetition of the second uplink shared channel transmission within the second set of repetitions, where the second repetition is received prior to remaining repetitions within the second set of repetitions. The operations of 1630 may be performed in accordance with examples as disclosed herein. In some examples, aspects of the operations of 1630 may be performed by a CSI receiver 1140 as described with reference to FIG. 11.

The following provides an overview of aspects of the present disclosure:

Aspect 1: A method for wireless communication at a UE, comprising: receiving, from a base station, signaling that schedules a first set of repetitions of a first uplink shared channel transmission associated with a first SRS resource set and a second set of repetitions of a second uplink shared channel transmission associated with a second SRS resource set; receiving, from the base station, a request that the UE is to transmit one or more CSI reports; receiving, from the base station, an indication that the one or more CSI reports are to be multiplexed with one of the first set of repetitions or the second set of repetitions or with both of the first set of repetitions and the second set of repetitions; and transmitting the one or more CSI reports in accordance with the indication.

Aspect 2: The method of aspect 1, further comprising: multiplexing, based at least in part on receiving the indication that the one or more CSI reports are to be multiplexed with both of the first set of repetitions and the second set of repetitions, a first of the one or more CSI reports with a first repetition of the first uplink shared channel transmission within the first set of repetitions, wherein the first repetition is transmitted prior to remaining repetitions within the first set of repetitions; and multiplexing a second of the one or more CSI reports with a second repetition of the second uplink shared channel transmission within the second set of repetitions, wherein the second repetition is transmitted prior to remaining repetitions within the second set of repetitions.

Aspect 3: The method of aspect 2, wherein multiplexing the first of the one or more CSI reports with the first repetition comprises multiplexing the first of the one or more CSI reports with a first actual repetition associated with the first repetition that is transmitted prior to any other actual repetitions associated with the first repetition; and multiplexing the second of the one or more CSI reports with the first repetition comprises multiplexing the second of the one or more CSI reports with a second actual repetition associated with the second repetition that is transmitted prior to any other actual repetitions associated with the second repetition.

Aspect 4: The method of any of aspects 2 through 3, wherein a first quantity of coded modulation symbols comprising the first of the one or more CSI reports equals a second quantity of coded modulation symbols comprising the second of the one or more CSI reports.

Aspect 5: The method of aspect 4, wherein a first payload size of first uplink control information included in the first repetition of the first uplink shared channel transmission equals a second payload size of second uplink control information included in the second repetition of the second uplink shared channel transmission; and the first quantity of coded modulation symbols equals the second quantity of coded modulation symbols based at least in part on the first payload size being equal to the second payload size.

Aspect 6: The method of any of aspects 4 through 5, further comprising: determining the first quantity based at least in part on a payload size of uplink control information included in the first repetition of the first uplink shared channel transmission; and selecting the second quantity based at least in part on determining the first quantity.

Aspect 7: The method of any of aspects 1 through 6, further comprising: multiplexing, based at least in part on receiving the indication that the one or more CSI reports are to be multiplexed with one of the first set of repetitions or the second set of repetitions, the one or more CSI reports with a repetition from the first set of repetitions or the second set of repetitions that is transmitted prior to remaining repetitions within the first set of repetitions and the second set of repetitions.

Aspect 8: The method of any of aspects 1 through 7, wherein transmitting the one or more CSI reports comprises: transmitting, based at least in part on receiving the indication that the one or more CSI reports are to be multiplexed with both of the first set of repetitions and the second set of repetitions, a first repetition of the first uplink shared channel transmission comprising a first of the one or more CSI reports via a first transmission beam associated with the first SRS resource set; and transmitting a second repetition of the second uplink shared channel transmission comprising a second of the one or more CSI reports via a second transmission beam associated with the second SRS resource set.

Aspect 9: The method of any of aspects 1 through 8, wherein receiving the indication further comprises: receiving RRC signaling indicating that the one or more CSI reports are to be multiplexed with one of the first set of repetitions or the second set of repetitions or with both of the first set of repetitions and the second set of repetitions.

Aspect 10: The method of any of aspects 1 through 9, further comprising: receiving, from the base station, RRC signaling indicating a plurality of CSI report groups which are each associated with a trigger state, the CSI reports associated with a given trigger state are to be multiplexed with one of the first set of repetitions or the second set of repetitions or with both of the first set of repetitions and the second set of repetitions based at least in part on the trigger state; and receiving, from the base station, DCI indicating one of the trigger states, wherein the DCI comprises the request that the UE is to transmit one or more CSI reports and the indication.

Aspect 11: The method of any of aspects 1 through 10, wherein receiving the indication further comprises: receiving DCI indicating that the one or more CSI reports are to be multiplexed with one of the first set of repetitions or the second set of repetitions or with both of the first set of repetitions and the second set of repetitions.

Aspect 12: The method of any of aspects 1 through 11, further comprising: determining that a quantity of repetitions in the first set of repetitions and the second set of repetitions is two based at least in part on an absence of a transport block associate with the first uplink shared channel transmission and the second uplink shared channel transmission and receiving the indication that the one or more CSI reports are to be multiplexed with both of the first set of repetitions and the second set of repetitions.

Aspect 13: The method of any of aspects 1 through 12, further comprising: receiving, from the base station, RRC signaling indicating a set of possible CSI report settings, wherein the request that the UE is to transmit one or more CSI reports indicates one of the possible CSI report settings.

Aspect 14: The method of any of aspects 1 through 13, wherein receiving the signaling and receiving the request comprises: receiving DCI, wherein the DCI schedules the first set of repetitions and the second set of repetitions and requests that the UE is to transmit one or more CSI reports.

Aspect 15: The method of any of aspects 1 through 14, wherein receiving the signaling that schedules the first set of repetitions and the second set of repetitions comprises: receiving DCI or RRC signaling indicating a quantity of repetitions in the first set of repetitions and the second set of repetitions.

Aspect 16: A method for wireless communication at a base station, comprising: transmitting, to a UE, signaling that schedules a first set of repetitions of a first uplink shared channel transmission associated with a first SRS resource set and a second set of repetitions of a second uplink shared channel transmission associated with a second SRS resource set; transmitting, to the UE, a request that the UE is to transmit one or more CSI reports; transmitting, to the UE, an indication that the one or more CSI reports are to be multiplexed with one of the first set of repetitions or the second set of repetitions or with both of the first set of repetitions and the second set of repetitions; and receiving the one or more CSI reports in accordance with the indication.

Aspect 17: The method of aspect 16, further comprising: receiving, based at least in part on transmitting the indication that the one or more CSI reports are to be multiplexed with both of the first set of repetitions and the second set of repetitions, a first of the one or more CSI reports with a first repetition of the first uplink shared channel transmission within the first set of repetitions, wherein the first repetition is received prior to remaining repetitions within the first set of repetitions; and receiving a second of the one or more CSI reports with a second repetition of the second uplink shared channel transmission within the second set of repetitions, wherein the second repetition is received prior to remaining repetitions within the second set of repetitions.

Aspect 18: The method of aspect 17, wherein receiving the first of the one or more CSI reports with the first repetition comprises receiving the first of the one or more CSI reports with a first actual repetition associated with the first repetition that is received prior to any other actual repetitions associated with the first repetition; and receiving the second of the one or more CSI reports with the first repetition comprises receiving the second of the one or more CSI reports with a second actual repetition associated with the second repetition that is received prior to any other actual repetitions associated with the second repetition.

Aspect 19: The method of any of aspects 17 through 18, wherein a first quantity of coded modulation symbols comprising the first of the one or more CSI reports equals a second quantity of coded modulation symbols comprising the second of the one or more CSI reports.

Aspect 20: The method of aspect 19, wherein a first payload size of first uplink control information included in the first repetition of the first uplink shared channel transmission equals a second payload size of second uplink control information included in the second repetition of the second uplink shared channel transmission; and the first quantity of coded modulation symbols equals the second quantity of coded modulation symbols based at least in part on the first payload size being equal to the second payload size.

Aspect 21: The method of any of aspects 16 through 20, further comprising: receiving, based at least in part on transmitting the indication that the one or more CSI reports are to be multiplexed with one of the first set of repetitions or the second set of repetitions, the one or more CSI reports with a repetition from the first set of repetitions or the second set of repetitions that is received prior to remaining repetitions within the first set of repetitions and the second set of repetitions.

Aspect 22: The method of any of aspects 16 through 21, wherein receiving the one or more CSI reports comprises: receiving, based at least in part on transmitting the indication that the one or more CSI reports are to be multiplexed with both of the first set of repetitions and the second set of repetitions, a first repetition of the first uplink shared channel transmission comprising a first of the one or more CSI reports via a first transmission beam associated with the first SRS resource set; and receiving a second repetition of the second uplink shared channel transmission comprising a second of the one or more CSI reports via a second transmission beam associated with the second SRS resource set.

Aspect 23: The method of any of aspects 16 through 22, wherein transmitting the indication comprises: transmitting RRC signaling indicating that the one or more CSI reports are to be multiplexed with one of the first set of repetitions or the second set of repetitions or with both of the first set of repetitions and the second set of repetitions.

Aspect 24: The method of any of aspects 16 through 23, further comprising: transmitting, to the UE, RRC signaling indicating a plurality of CSI report groups which are each associated with a trigger state, the CSI reports associated with a given trigger state are to be multiplexed, by the UE, with one of the first set of repetitions or the second set of repetitions or with both of the first set of repetitions and the second set of repetitions based at least in part on the trigger state; and transmitting, to the UE, DCI indicating one of the trigger states, wherein the DCI comprises the request that the UE is to transmit one or more CSI reports and the indication.

Aspect 25: The method of any of aspects 16 through 24, wherein transmitting the indication comprises: transmitting DCI indicating that the one or more CSI reports are to be multiplexed with one of the first set of repetitions or the second set of repetitions or with both of the first set of repetitions and the second set of repetitions.

Aspect 26: The method of any of aspects 16 through 25, wherein a quantity of repetitions in the first set of repetitions and the second set of repetitions is two based at least in part on an absence of a transport block associate with the first uplink shared channel transmission and the second uplink shared channel transmission and transmitting the indication that the one or more CSI reports are to be multiplexed with both of the first set of repetitions and the second set of repetitions.

Aspect 27: The method of any of aspects 16 through 26, further comprising: transmitting, to the UE, RRC signaling indicating a set of possible CSI report settings, wherein the request that the UE is to transmit one or more CSI reports indicates one of the possible CSI report settings.

Aspect 28: The method of any of aspects 16 through 27, wherein transmitting the signaling and transmitting the request comprises: transmitting DCI, wherein the DCI schedules the first set of repetitions and the second set of repetitions and requests that the UE is to transmit one or more CSI reports.

Aspect 29: The method of any of aspects 16 through 28, wherein transmitting the signaling comprises: transmitting DCI or RRC signaling indicating a quantity of repetitions in the first set of repetitions and the second set of repetitions.

Aspect 30: An apparatus for wireless communication at a UE, comprising a processor; memory coupled with the processor; and instructions stored in the memory and executable by the processor to cause the apparatus to perform a method of any of aspects 1 through 15.

Aspect 31: An apparatus for wireless communication at a UE, comprising at least one means for performing a method of any of aspects 1 through 15.

Aspect 32: A non-transitory computer-readable medium storing code for wireless communication at a UE, the code comprising instructions executable by a processor to perform a method of any of aspects 1 through 15.

Aspect 33: An apparatus for wireless communication at a base station, comprising a processor; memory coupled with the processor; and instructions stored in the memory and executable by the processor to cause the apparatus to perform a method of any of aspects 16 through 29.

Aspect 34: An apparatus for wireless communication at a base station, comprising at least one means for performing a method of any of aspects 16 through 29.

Aspect 35: A non-transitory computer-readable medium storing code for wireless communication at a base station, the code comprising instructions executable by a processor to perform a method of any of aspects 16 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, from a network entity, signaling that schedules a first set of repetitions of a first uplink shared channel transmission associated with a first sounding reference signal resource set and a second set of repetitions of a second uplink shared channel transmission associated with a second sounding reference signal resource set;

receiving, from the network entity, a request that the UE is to transmit one or more channel state information reports;

receiving, from the network entity, an indication that the one or more channel state information reports are to be multiplexed with one of the first set of repetitions or the second set of repetitions or with both of the first set of repetitions and the second set of repetitions; and transmitting the one or more channel state information reports in accordance with the indication.

2. The method of claim 1, further comprising:

multiplexing, based at least in part on receiving the indication that the one or more channel state information reports are to be multiplexed with both of the first set of repetitions and the second set of repetitions, a first of the one or more channel state information reports with a first repetition of the first uplink shared channel transmission within the first set of repetitions, wherein the first repetition is transmitted prior to remaining repetitions within the first set of repetitions; and multiplexing a second of the one or more channel state information reports with a second repetition of the second uplink shared channel transmission within the second set of repetitions, wherein the second repetition is transmitted prior to remaining repetitions within the second set of repetitions.

3. The method of claim 2, wherein a first quantity of coded modulation symbols comprising the first of the one or more channel state information reports equals a second quantity of coded modulation symbols comprising the second of the one or more channel state information reports.

4. The method of claim 3, wherein:

a first payload size of first uplink control information included in the first repetition of the first uplink shared channel transmission equals a second payload size of second uplink control information included in the second repetition of the second uplink shared channel transmission, and the first quantity of coded modulation symbols equals the second quantity of coded modulation symbols based at least in part on the first payload size being equal to the second payload size.

5. The method of claim 1, further comprising:

determining that a quantity of repetitions in the first set of repetitions and the second set of repetitions is two based at least in part on an absence of a transport block associate with the first uplink shared channel transmission and the second uplink shared channel transmission and receiving the indication that the one or more channel state information reports are to be multiplexed with both of the first set of repetitions and the second set of repetitions.

6. The method of claim 2, wherein:

multiplexing the first of the one or more channel state information reports with the first repetition comprises multiplexing the first of the one or more channel state information reports with a first actual repetition associated with the first repetition that is transmitted prior to any other actual repetitions associated with the first repetition, and multiplexing the second of the one or more channel state information reports with the first repetition comprises multiplexing the second of the one or more channel state information reports with a second actual repetition associated with the second repetition that is transmitted prior to any other actual repetitions associated with the second repetition.

7. The method of claim 3, further comprising:

determining the first quantity based at least in part on a payload size of uplink control information included in the first repetition of the first uplink shared channel transmission; and selecting the second quantity based at least in part on determining the first quantity.

8. The method of claim 1, further comprising:

multiplexing, based at least in part on receiving the indication that the one or more channel state information reports are to be multiplexed with one of the first set of repetitions or the second set of repetitions, the one or more channel state information reports with a repetition from the first set of repetitions or the second set of repetitions that is transmitted prior to remaining repetitions within the first set of repetitions and the second set of repetitions.

9. The method of claim 1, wherein transmitting the one or more channel state information reports comprises:

transmitting, based at least in part on receiving the indication that the one or more channel state information reports are to be multiplexed with both of the first set of repetitions and the second set of repetitions, a first repetition of the first uplink shared channel transmission comprising a first of the one or more channel state information reports via a first transmission beam associated with the first sounding reference signal resource set; and transmitting a second repetition of the second uplink shared channel transmission comprising a second of the one or more channel state information reports via a second transmission beam associated with the second sounding reference signal resource set.

10. The method of claim 1, further comprising:

receiving, from the network entity, radio resource control signaling indicating a set of possible channel state information report settings, wherein the request that the UE is to transmit the one or more channel state information reports indicates one of the set of possible channel state information report settings.

11. The method of claim 1, wherein receiving the signaling and receiving the request comprises:

receiving downlink control information, wherein the downlink control information schedules the first set of repetitions and the second set of repetitions and requests that the UE is to transmit the one or more channel state information reports.

12. The method of claim 1, wherein receiving the signaling that schedules the first set of repetitions and the second set of repetitions comprises:

receiving downlink control information or radio resource control signaling indicating a quantity of repetitions in the first set of repetitions and the second set of repetitions.

13. A method for wireless communication at a network entity, comprising:

transmitting, to a user equipment (UE), signaling that schedules a first set of repetitions of a first uplink shared channel transmission associated with a first sounding reference signal resource set and a second set of repetitions of a second uplink shared channel transmission associated with a second sounding reference signal resource set;

transmitting, to the UE, a request that the UE is to transmit one or more channel state information reports;

transmitting, to the UE, an indication that the one or more channel state information reports are to be multiplexed with one of the first set of repetitions or the second set of repetitions or with both of the first set of repetitions and the second set of repetitions; and receiving the one or more channel state information reports in accordance with the indication.

14. The method of claim 13, further comprising:

receiving, based at least in part on transmitting the indication that the one or more channel state information reports are to be multiplexed with both of the first set of repetitions and the second set of repetitions, a first of the one or more channel state information reports with a first repetition of the first uplink shared channel transmission within the first set of repetitions, wherein the first repetition is received prior to remaining repetitions within the first set of repetitions; and receiving a second of the one or more channel state information reports with a second repetition of the second uplink shared channel transmission within the second set of repetitions, wherein the second repetition is received prior to remaining repetitions within the second set of repetitions.

15. The method of claim 14, wherein a first quantity of coded modulation symbols comprising the first of the one or more channel state information reports equals a second quantity of coded modulation symbols comprising the second of the one or more channel state information reports.

16. The method of claim 15, wherein:

a first payload size of first uplink control information included in the first repetition of the first uplink shared channel transmission equals a second payload size of second uplink control information included in the second repetition of the second uplink shared channel transmission; and the first quantity of coded modulation symbols equals the second quantity of coded modulation symbols based at least in part on the first payload size being equal to the second payload size.

17. The method of claim 13, wherein a quantity of repetitions in the first set of repetitions and the second set of repetitions is two based at least in part on an absence of a transport block associate with the first uplink shared channel transmission and the second uplink shared channel transmission and transmitting the indication that the one or more channel state information reports are to be multiplexed with both of the first set of repetitions and the second set of repetitions.

18. The method of claim 14, wherein:

receiving the first of the one or more channel state information reports with the first repetition comprises receiving the first of the one or more channel state information reports with a first actual repetition associated with the first repetition that is received prior to any other actual repetitions associated with the first repetition; and receiving the second of the one or more channel state information reports with the first repetition comprises receiving the second of the one or more channel state information reports with a second actual repetition associated with the second repetition that is received prior to any other actual repetitions associated with the second repetition.

19. The method of claim 13, further comprising:

receiving, based at least in part on transmitting the indication that the one or more channel state information reports are to be multiplexed with one of the first set of repetitions or the second set of repetitions, the one or more channel state information reports with a repetition from the first set of repetitions or the second set of repetitions that is received prior to remaining repetitions within the first set of repetitions and the second set of repetitions.

20. The method of claim 13, wherein receiving the one or more channel state information reports comprises:

receiving, based at least in part on transmitting the indication that the one or more channel state information reports are to be multiplexed with both of the first set of repetitions and the second set of repetitions, a first repetition of the first uplink shared channel transmission comprising a first of the one or more channel state information reports via a first transmission beam associated with the first sounding reference signal resource set; and receiving a second repetition of the second uplink shared channel transmission comprising a second of the one or more channel state information reports via a second transmission beam associated with the second sounding reference signal resource set.

21. The method of claim 13, further comprising:

transmitting, to the UE, radio resource control signaling indicating a set of possible channel state information report settings, wherein the request that the UE is to transmit the one or more channel state information reports indicates one of the set of possible channel state information report settings.

22. The method of claim 13, wherein transmitting the signaling and transmitting the request comprises:

transmitting downlink control information, wherein the downlink control information schedules the first set of repetitions and the second set of repetitions and requests that the UE is to transmit the one or more channel state information reports.

23. The method of claim 13, wherein transmitting the signaling comprises:

transmitting downlink control information or radio resource control signaling indicating a quantity of repetitions in the first set of repetitions and the second set of repetitions.

24. A user equipment (UE) for wireless communication, comprising:

one or more memories storing processor-executable code; and one or more processors coupled with the one or more memories and individually or collectively operable to cause the UE to:

receive, from a network entity, signaling that schedules a first set of repetitions of a first uplink shared channel transmission associated with a first sounding reference signal resource set and a second set of repetitions of a second uplink shared channel transmission associated with a second sounding reference signal resource set;

receive, from the network entity, a request that the UE is to transmit one or more channel state information reports;

receive, from the network entity, an indication that the one or more channel state information reports are to be multiplexed with one of the first set of repetitions or the second set of repetitions or with both of the first set of repetitions and the second set of repetitions; and transmit the one or more channel state information reports in accordance with the indication.

25. The UE of claim 24, wherein the one or more processors are individually or collectively further operable to execute the code to cause the UE to:

multiplexing, based at least in part on receiving the indication that the one or more channel state information reports are to be multiplexed with both of the first set of repetitions and the second set of repetitions, a first of the one or more channel state information reports with a first repetition of the first uplink shared channel transmission within the first set of repetitions, wherein the first repetition is transmitted prior to remaining repetitions within the first set of repetitions; and multiplex a second of the one or more channel state information reports with a second repetition of the second uplink shared channel transmission within the second set of repetitions, wherein the second repetition is transmitted prior to remaining repetitions within the second set of repetitions.

26. The UE of claim 25, wherein:

multiplexing the first of the one or more channel state information reports with the first repetition comprises multiplexing the first of the one or more channel state information reports with a first actual repetition associated with the first repetition that is transmitted prior to any other actual repetitions associated with the first repetition; and multiplexing the second of the one or more channel state information reports with the first repetition comprises multiplexing the second of the one or more channel state information reports with a second actual repetition associated with the second repetition that is transmitted prior to any other actual repetitions associated with the second repetition.

27. The UE of claim 25, wherein a first quantity of coded modulation symbols comprising the first of the one or more channel state information reports equals a second quantity of coded modulation symbols comprising the second of the one or more channel state information reports.

28. A network entity for wireless communication, comprising:

one or more memories storing processor-executable code; and one or more processors coupled with the one or more memories and individually or collectively operable to cause the network entity to:

transmit, to a user equipment (UE), signaling that schedules a first set of repetitions of a first uplink shared channel transmission associated with a first sounding reference signal resource set and a second set of repetitions of a second uplink shared channel transmission associated with a second sounding reference signal resource set;

transmit, to the UE, a request that the UE is to transmit one or more channel state information reports;

transmit, to the UE, an indication that the one or more channel state information reports are to be multiplexed with one of the first set of repetitions or the second set of repetitions or with both of the first set of repetitions and the second set of repetitions; and receive the one or more channel state information reports in accordance with the indication.

29. The network entity of claim 28, wherein the one or more processors are individually or collectively further operable to execute the code to cause the network entity to:

receive, based at least in part on transmitting the indication that the one or more channel state information reports are to be multiplexed with both of the first set of repetitions and the second set of repetitions, a first of the one or more channel state information reports with a first repetition of the first uplink shared channel transmission within the first set of repetitions, wherein the first repetition is received prior to remaining repetitions within the first set of repetitions; and receive a second of the one or more channel state information reports with a second repetition of the second uplink shared channel transmission within the second set of repetitions, wherein the second repetition is received prior to remaining repetitions within the second set of repetitions.

30. The network entity of claim 29, wherein:

receiving the first of the one or more channel state information reports with the first repetition comprises receiving the first of the one or more channel state information reports with a first actual repetition associated with the first repetition that is received prior to any other actual repetitions associated with the first repetition; and receiving the second of the one or more channel state information reports with the first repetition comprises receiving the second of the one or more channel state information reports with a second actual repetition associated with the second repetition that is received prior to any other actual repetitions associated with the second repetition.

* * * * *